US009758244B2

(12) United States Patent
Mercer et al.

(10) Patent No.: US 9,758,244 B2
(45) Date of Patent: Sep. 12, 2017

(54) ROTORCRAFT AUTOPILOT AND METHODS

(71) Applicant: Merlin Technology, Inc., Kent, WA (US)

(72) Inventors: John E. Mercer, Gig Harbor, WA (US); Nicolas Albion, Burien, WA (US); Mark Bartel, Renton, WA (US); Marc Feifel, Seattle, WA (US); Mark Marvin, Tacoma, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

(21) Appl. No.: 15/015,689

(22) Filed: Feb. 4, 2016

(65) Prior Publication Data

US 2016/0152330 A1 Jun. 2, 2016

Related U.S. Application Data

(62) Division of application No. 13/763,574, filed on Feb. 8, 2013, now Pat. No. 9,272,780.
(Continued)

(51) Int. Cl.
*B64C 27/57* (2006.01)
*B64C 27/64* (2006.01)
(Continued)

(52) U.S. Cl.
CPC .............. *B64C 27/57* (2013.01); *B64C 13/18* (2013.01); *B64C 13/42* (2013.01); *B64C 27/56* (2013.01);
(Continued)

(58) Field of Classification Search
CPC ......... B64C 27/56; B64C 13/18; B64C 13/42; B64C 27/57; B64C 27/64; B64C 27/68;
(Continued)

(56) References Cited

U.S. PATENT DOCUMENTS 3,198,922 A 8/1965 Etienne
3,679,956 A 7/1972 Redmond
(Continued)

FOREIGN PATENT DOCUMENTS

CN 1669874 A 9/2005
CN 101048640 A 10/2007
(Continued)

OTHER PUBLICATIONS

The First Office Action of the The State Intellectual Property Office of People's Republic of China for Chinese Application No. 201380008002.9 which is associated with International Application No. PCT/US2013/025456 which is associated with U.S. Appl. No. 13/763,574, Feb. 14, 2016.
(Continued)

*Primary Examiner* — Marthe Marc-Coleman
(74) *Attorney, Agent, or Firm* — Pritzkau Patent Group, LLC

(57) ABSTRACT

A helicopter autopilot system includes an inner loop for attitude hold for the flight of the helicopter including a given level of redundancy applied to the inner loop. An outer loop is configured for providing a navigation function with respect to the flight of the helicopter including a different level of redundancy than the inner loop. An actuator provides a braking force on a linkage that serves to stabilize the flight of the helicopter during a power failure. The actuator is electromechanical and receives electrical drive signals to provide automatic flight control of the helicopter without requiring a hydraulic assistance system in the helicopter. The autopilot can operate the helicopter in a failed mode of the hydraulic assistance system. A number of flight modes are described with associated sensor inputs including rate based and true attitude modes.

14 Claims, 11 Drawing Sheets

Related U.S. Application Data

(60) Provisional application No. 61/597,555, filed on Feb. 10, 2012, provisional application No. 61/597,570, filed on Feb. 10, 2012, provisional application No. 61/597,581, filed on Feb. 10, 2012.

(51) Int. Cl.

| | | |
|---|---|---|
| *B64C 27/68* | (2006.01) | |
| *G05D 1/08* | (2006.01) | |
| *B64C 27/56* | (2006.01) | |
| *G05D 1/10* | (2006.01) | |
| *B64C 13/18* | (2006.01) | |
| *B64C 13/42* | (2006.01) | |
| *B64C 27/59* | (2006.01) | |
| *G05D 1/00* | (2006.01) | |

(52) U.S. Cl.
CPC .............. *B64C 27/59* (2013.01); *B64C 27/64* (2013.01); *B64C 27/68* (2013.01); *G05D 1/0077* (2013.01); *G05D 1/0816* (2013.01); *G05D 1/0858* (2013.01); *G05D 1/102* (2013.01); *Y02T 50/44* (2013.01)

(58) Field of Classification Search
CPC ...... B64C 27/59; G05D 1/102; G05D 1/0816; G05D 1/0858; G05D 1/0077; Y02T 50/44
USPC ............ 701/3, 13; 244/177, 192, 175, 17.13
See application file for complete search history.

(56) References Cited

U.S. PATENT DOCUMENTS

| | | | |
|---|---|---|---|
| 4,003,532 A | 1/1977 | Adams, Sr. et al. | |
| 4,029,271 A | 6/1977 | Murphy | |
| 4,034,605 A | 7/1977 | Green | |
| 4,091,244 A | 5/1978 | Chu et al. | |
| 4,279,391 A | 7/1981 | Adams et al. | |
| 4,371,937 A | 2/1983 | Adams et al. | |
| 4,580,223 A | 4/1986 | Wright | |
| 4,584,510 A | 4/1986 | Hollow | |
| 4,628,455 A | 12/1986 | Skutecki | |
| 4,739,128 A | 4/1988 | Grisham | |
| 4,763,285 A | 8/1988 | Moore et al. | |
| 4,965,879 A | 10/1990 | Fischer, Jr. | |
| 5,195,700 A | 3/1993 | Fogler et al. | |
| 5,204,605 A | 4/1993 | Delattre et al. | |
| 5,299,759 A | 4/1994 | Sherman et al. | |
| 5,522,568 A | 6/1996 | Kamen et al. | |
| 5,694,014 A | 12/1997 | Hegg et al. | |
| 5,793,356 A | 8/1998 | Svancarek et al. | |
| 6,038,498 A | 3/2000 | Briffe et al. | |
| 6,092,919 A | 7/2000 | Calise | |
| 6,119,834 A | 9/2000 | Lee | |
| 6,314,343 B1 | 11/2001 | Adams et al. | |
| 6,325,331 B1 | 12/2001 | McKeown | |
| 6,580,418 B1 | 6/2003 | Grome et al. | |
| 6,697,758 B2 | 2/2004 | McCall et al. | |
| 7,305,286 B1 | 12/2007 | Younkin et al. | |
| 7,568,662 B1 | 8/2009 | Conner | |
| 7,624,943 B2 | 12/2009 | Cerchie et al. | |
| 7,954,614 B2 | 6/2011 | Mercer | |
| 7,976,310 B2 | 7/2011 | Bachelder et al. | |
| 8,134,328 B2 | 3/2012 | Hanlon et al. | |
| 8,195,346 B1 | 6/2012 | Duerksen et al. | |
| 8,360,369 B2 | 1/2013 | Mercer et al. | |
| 8,948,936 B2 | 2/2015 | Shue et al. | |
| 2002/0030142 A1 | 3/2002 | James | |
| 2005/0173595 A1 | 8/2005 | Hoh | |
| 2006/0058928 A1 | 3/2006 | Beard et al. | |
| 2007/0164167 A1 | 7/2007 | Bachelder et al. | |
| 2007/0164168 A1 | 7/2007 | Hirvonen et al. | |
| 2007/0182590 A1 | 8/2007 | Younkin | |
| 2007/0221782 A1 | 9/2007 | Cerchie et al. | |
| 2008/0036617 A1 | 2/2008 | Arms et al. | |
| 2008/0294305 A1 | 11/2008 | Roesch | |
| 2010/0076625 A1 | 3/2010 | Yoeli | |
| 2010/0123045 A1 | 5/2010 | Grieser | |
| 2010/0210391 A1* | 8/2010 | Dinger | B64C 13/28 475/149 |
| 2011/0022250 A1 | 1/2011 | Hamburg | |
| 2011/0031346 A1* | 2/2011 | Allieta | B64C 27/56 244/17.13 |
| 2011/0046824 A1 | 2/2011 | Antraygue | |
| 2011/0121126 A1 | 5/2011 | Mercer et al. | |
| 2011/0137492 A1 | 6/2011 | Sahasrabudhe et al. | |
| 2011/0190964 A1 | 8/2011 | Petillon | |
| 2011/0276202 A1 | 11/2011 | Carlavan et al. | |
| 2012/0068004 A1 | 3/2012 | Hatamian | |
| 2012/0097800 A1 | 4/2012 | Burroughs et al. | |
| 2012/0277933 A1 | 11/2012 | Krogh et al. | |
| 2012/0286088 A1 | 11/2012 | Mercer et al. | |
| 2013/0261853 A1 | 10/2013 | Shue et al. | |
| 2014/0027565 A1 | 1/2014 | Marvin et al. | |
| 2014/0027566 A1 | 1/2014 | Mercer et al. | |
| 2014/0244078 A1 | 8/2014 | Downey | |

FOREIGN PATENT DOCUMENTS

| | | |
|---|---|---|
| EP | 0313470 A1 | 4/1989 |
| EP | 1840861 A2 | 10/2007 |
| EP | 1996459 B1 | 12/2008 |
| RU | 8813 U1 | 12/1998 |
| RU | 2282562 C1 | 8/2006 |
| RU | 2369907 C2 | 10/2009 |
| TW | 479131 B | 3/2002 |
| WO | 2008/065664 A2 | 6/2008 |
| WO | 2009/130576 A1 | 10/2009 |

OTHER PUBLICATIONS

The Second Office Action of the The State Intellectual Property Office of People's Republic of China for Chinese Application No. 201380007952.X which is associated with International Application No. PCT/US2013/025458 which is associated with U.S. Appl. No. 13/763,590, Mar. 9, 2016.

Extended European Search Report for European Application No. 13787117.4 which is associated with International Application No. PCT/US2013/025456 which is associated with U.S. Appl. No. 13/763,574, Jun. 6, 2016, Munich, Germany.

The First Office Action of The State Intellectual Property Office of People's Republic of China for Chinese Application No. 201380007947.9 which is associated with International Application No. PCT/US2013/025452 which is associated with U.S. Appl. No. 13/763,582, May 11, 2016.

Partial Supplementary European Search Report for European Application No. 13746980.6 which is associated with International Application No. PCT/US2013/025452 which is associated with U.S. Appl. No. 13/763,582, Jun. 29, 2016, Munich, Germany.

The Third Office Action of the The State Intellectual Property Office of People's Republic of China for Chinese Application No. 201380007952.X which is associated with International Application No. PCT/US2013/025458 which is associated with U.S. Appl. No. 13/763,590, Jul. 28, 2016.

The International Search Report and The Written Opinion of the International Searching Authority for International Application No. PCT/US2013/025458 which is associated with U.S. Appl. No. 13/763,590, Dec. 5, 2013, Moscow, Russia.

The International Search Report and The Written Opinion of the International Searching Authority for International Application No. PCT/US2013/025456 which is associated with U.S. Appl. No. 13/763,574, Dec. 5, 2013, Moscow, Russia.

The International Search Report and The Written Opinion of the International Searching Authority for International Application No. PCT/US2013/025452 which is associated with U.S. Appl. No. 13/763,582, May 16, 2013, Moscow, Russia.

Thai Technics.Com, Flight Direction Control, Apr. 30, 2001, Retrieved from the Internet: <URL:http://www.thaitechnics.com/helicopter/heli_control_3.html.>.

(56) References Cited

OTHER PUBLICATIONS

Paul G. Savage, Strapdown Inertial Navigation Integration Algorithm Design Part 1: Attitude Algorithms, Jan.-Feb. 1998, Journal of Guidance, Control, and Dynamics, vol. 21, No. 1.
Paul G. Savage, Strapdown Inertial Navigation Integration Algorithm Design Part 2: Velocity and Position Algorithms, Mar.-Apr. 1998, Journal of Guidance, Control, and Dynamics, vol. 21, No. 2.
William Premerlani, Robust Estimator of the Direction Cosine Matrix, Feb. 22, 2009, http://diydrones.com/forum/topics/robust-estimator-of-the.
William Premerlani, Wind Estimation without an Airspeed Sensor, Jan. 29, 2010, http://diydrones.com, UAV Dev Board.
William Premerlani and Paul Bizard, Direction Cosine Matrix IMU: Theory, May 17, 2009, http://diydrones.com.
The International Preliminary Report on Patentability for International Application No. PCT/US2013/025456 which is associated with U.S. Appl. No. 13/763,574, Jun. 16, 2014, Alexandria, Virginia.
The International Preliminary Report on Patentability for International Application No. PCT/US2013/025458 which is associated with U.S. Appl. No. 13/763,590, Aug. 12, 2014, Geneva, Switzerland.
Office Action dated Aug. 12, 2014 for co-pending U.S. Appl. No. 13/763,582, filed Feb. 8, 2013.
Shawn Coyle, Nov. 7, 2011, "Understanding Your Autopilot", http://www.verticalmag.com/news/article/understanding-your-autopilot-pt-3.html.
Extended European Search Report for International Application No. PCT/US2013/025458 which is associated with U.S. Appl. No. 13/763,590, Sep. 2, 2015, Munich, Germany.
The First Office Action of the The State Intellectual Property Office of People's Republic of China for Chinese Application No. 201380007952.X which is associated with International Application No. PCT/US2013/025458 which is associated with U.S. Appl. No. 13/763,590, Aug. 4, 2015. (Machine translation included).
Written Opinion of the International Preliminary Examining Authority for International Application No. PCT/US2013/025452 which is associated with U.S. Appl. No. 13/763,582, Jan. 15, 2015, Alexandria, VA.
Applicant Response to the Jan. 15, 2015 Written Opinion of the International Preliminary Examining Authority for International Application No. PCT/US2013/025452 which is associated with U.S. Appl. No. 13/763,582, Feb. 13, 2015, Los Angeles, CA.
The Second Office Action of The State Intellectual Property Office of People's Republic of China for Chinese Application No. 2013800080029 which is associated with International Application No. PCT/US2013/025456 which is associated with U.S. Appl. No. 13/763,574, Sep. 26, 2016. (Machine translation included).
The Third Office Action of The State Intellectual Property Office of People's Republic of China for Chinese Application No. 2013800080029 which is associated with International Application No. PCT/US2013/025456 which is associated with U.S. Appl. No. 13/763,574, Feb. 13, 2017. (Machine translation included).
Extended European Search Report for European Application No. 13746908.6 which is associated with International Application No. PCT/US2013/025452 which is associated with U.S. Appl. No. 13/763,582, Oct. 4, 2016, Munich, Germany.
The Second Office Action of The State Intellectual Property Office of People's Republic of China for Chinese Application No. 201380007947.9 which is associated with International Application No. PCT/US2013/025452 which is associated with U.S. Appl. No. 13/763,582, Mar. 3, 2017. (Machine translation included).
The First Office Action of the European Patent Office for European Application No. 13790956.0 which is associated with International Application No. PCT/US2013/025458 which is associated with U.S. Appl. No. 13/763,590, Sep. 15, 2016.
Du Dacheng et al., Design of Autopilot for Small UAV, Computer Measurement & Control, 2010. 18(11), p. 2681-2686, Dec. 31, 2010. (Machine translation included).
Research on Fault Tolerant Pilot Control System of Unmanned Aerial Vehicle, Chinese Master's Theses Full-text database, Engineering Science and Technology II, Dec. 15, 2007, vol. 6, C031-110, Dec. 15, 2007. (Machine translation included).
The First Office Action of The Russian Federation for Russian Application No. 2014131912 which is associated with International Application No. PCT/US2013/025458 which is associated with U.S. Appl. No. 13/763,590, dated Mar. 14, 2017. (Machine translation included).

* cited by examiner

| Mode | Title | Inner Loop | | | | | | | | Outer Loop | | | | | | |
|---|---|---|---|---|---|---|---|---|---|---|---|---|---|---|---|---|
| | | Rates | Accels | Course | Lat/Lon | Speed (1) | Mag | Rates | Accels | Course | Lat/Lon | Speed (1) | Mag | Alt (2) | Attitude (from inner loop) |
| 1 | Course/Speed Rate Based | Roll, Pitch | Vertical | | | | | Pitch, Yaw | Vertical | X | | X | | | |
| 2 | Course/Alt Rate Based | Roll, Pitch | Vertical | | | | | Pitch, Yaw | Vertical | X | | X | | X | |
| 3 | Position Hold Rate Based | Roll, Pitch | Vertical | | | | | Triaxial | Vertical | X | X | | Roll, Pitch | | |
| 4 | Course/Speed True Attitude | Triaxial | Triaxial | X | | X | Triaxial | Pitch, Yaw | Vertical | X | | X | | | X |
| 5 | Course/Alt True Attitude | Triaxial | Triaxial | X | | X | Triaxial | Pitch, Yaw | Vertical | X | | X | | X | X |
| 6 | Position Hold True Attitude | Triaxial | Triaxial | X | | X | Triaxial | Triaxial | Vertical | X | X | X | | | X |

An "X" indicates that a particular signal is in use, otherwise specific signals may be identified.

(1) In any embodiment requiring a speed signal, the signal can be GPS-based or provided by an aircraft airspeed sensor.

(2) In any embodiment requiring an altitude signal, the signal can be GPS-based or provided by a pressure-based altitude sensor.

FIGURE 11

ROTORCRAFT AUTOPILOT AND METHODS

RELATED APPLICATIONS

This application is a divisional application of copending U.S. patent application Ser. No. 13/763,574 filed on Feb. 8, 2013, the disclosure of which is incorporated herein by reference and which claims priority from U.S. Provisional Patent Application Ser. No. 61/597,555; U.S. Provisional Patent Application Ser. No. 61/597,570; and U.S. Provisional Patent Application Ser. No. 61/597,581, each of which was filed on Feb. 10, 2012 and each of which is hereby incorporated by reference in its entirety.

BACKGROUND

The present application is generally related to flight control systems and, more particularly, to a rotorcraft autopilot and associated methods.

A helicopter is inherently unstable, generally requiring that the pilot maintain a constant interaction with the cyclic control using one hand. Even a momentary release of the cyclic can result in the cyclic or control stick "flopping over", accompanied by a loss of control of the helicopter. This is particularly inconvenient when the pilot has a need to engage in hands-free activities such as, for example, adjusting a headset or referring to a hardcopy of a map. Further, the need to constantly control the cyclic can result in pilot fatigue.

Traditional autopilots can provide benefits which include allowing the pilot to release the cyclic to engage in hands-free tasks, as well as reducing pilot fatigue. Applicants recognize, however, that the cost of a traditional helicopter autopilot can be prohibitive. For example, the cost can be so significant in comparison to the cost of the helicopter itself that autopilots are uncommon in light helicopters.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, an autopilot system for a helicopter, associated components, and methods are described. In one aspect of the disclosure, an inner loop is configured at least for providing a true attitude for the flight of the helicopter including a given level of redundancy applied to the inner loop. An outer, autopilot loop is configured for providing at least one navigation function with respect to the flight of the helicopter including a different level of redundancy than the inner loop.

In another aspect of the disclosure an actuator arrangement forms part of an autopilot for providing automatic control of a helicopter by actuating one or more flight controls of the helicopter. At least one electric motor includes an output shaft and a motor coil arrangement for receiving a drive current that produces rotation of the output shaft. An actuator linkage is operatively coupled between the output shaft of the motor and the flight controls such that rotation of the output shaft produces a corresponding movement of the actuator linkage and the flight controls. A motor drive arrangement is operable to provide the drive current from a power source during normal operation of the autopilot and at least for shorting the motor coil arrangement responsive to a failure of the power source such that the motor provides a braking force on the actuator linkage that serves to stabilize the flight of the helicopter during the power failure.

In still another aspect of the present disclosure, an embodiment of an autopilot system and associated method are described for a helicopter which includes a GPS unit that provides a GPS output. A sensor arrangement is dedicated to the autopilot and produces a set of sensor outputs to characterize the flight of the helicopter. A control arrangement receives the GPS output and the sensor outputs and generates electrical drive signals in response thereto. An actuator is electromechanical and receives the electrical drive signals to generate mechanical control outputs responsive thereto that are mechanically coupled to the helicopter to provide automatic flight control of the helicopter without requiring a hydraulic system in the helicopter.

In yet another aspect of the present disclosure, an autopilot system and associated method are described for a helicopter which includes a hydraulic assistance system that receives flight control inputs from a pilot and, in turn, produces mechanical outputs that are mechanically coupled to the helicopter to provide pilot control of the helicopter. A sensor arrangement produces a set of sensor outputs that characterize the flight of the helicopter. A control arrangement receives the sensor outputs and generates electrical drive signals. An actuator arrangement is electromechanical and receives the electrical drive signals to generate control outputs responsive thereto that are mechanically coupled to the hydraulic assistance system and is configured to cooperate with the control arrangement to provide automatic flight control of the helicopter in a first, normal mode with the hydraulic assistance system in a normal operational status and in a second, failed mode with the hydraulic assistance system in a failed operational status to provide automatic flight control of the helicopter in each of the normal mode and the failed mode.

In a continuing aspect of the present disclosure, a flight control system and associated method are described for selective automatic control of the forward flight of a helicopter which forward flight is characterized by a set of orientation parameters including a pitch orientation, a roll orientation and a yaw orientation. In embodiments, a triaxial MEMS rate sensor is supported by the helicopter for generating a roll rate signal, a pitch rate signal and a yaw rate signal that are responsive to changes in said roll orientation, pitch orientation and yaw orientation, respectively. A MEMS triaxial accelerometer generates accelerometer signals responsive to the forward flight. A GPS receiver is supported by the helicopter for generating a course signal and a speed signal responsive to the forward flight of the helicopter. A triaxial magnetometer generates magnetometer signals. A controller receives a set of inputs consisting of the pitch rate signal, the roll rate signal, the yaw rate signal, the accelerometer signals, the course signal, the magnetometer signals, and the speed signal to determine a true attitude of the helicopter and generate a set of control signals to maintain a stable forward flight orientation of the helicopter according to a selected course defined on the ground and a selected speed. An actuator arrangement receives the set of control signals to adjust the forward flight of the helicopter based on the set of control signals. In one embodiment, the speed signal can be provided by the GPS. In another embodiment, the speed signal can be provided by an aircraft airspeed sensor.

In a further aspect of the present disclosure, a flight control system and associated method are described for selective automatic control of the forward flight of a helicopter which forward flight is characterized by a set of orientation parameters including a pitch orientation, a roll orientation and a yaw orientation. In embodiments, a triaxial MEMS rate sensor is supported by the helicopter for generating a roll rate signal, a pitch rate signal and a yaw rate signal that are responsive to changes in said roll orientation, pitch orientation and yaw orientation, respectively. A MEMS triaxial accelerometer generates accelerometer signals responsive to the forward flight. A GPS receiver is supported by the helicopter for generating a course signal, an altitude signal, and a speed signal responsive to the forward flight of the helicopter. A triaxial magnetometer generates magnetometer heading signals. A controller is supported by the helicopter to receive a set of inputs consisting of the pitch rate signal, the roll rate signal, the yaw rate signal, the acceleration signals, the course signal, the altitude signal, the magnetometer heading signals and the speed signal to determine a true attitude of the helicopter and to generate a set of control signals to maintain a stable forward flight orientation of the helicopter according to a selected course defined on the ground and a selected altitude on the selected course. An actuator arrangement receives the set of control signals to adjust the forward flight of the helicopter based on the set of control signals. In one embodiment, the speed signal and/or the altitude signal can be provided by the GPS. In another embodiment, respective ones of the speed signal and/or the altitude signal can be provided by an aircraft airspeed sensor and/or a pressure-based altitude sensor.

In another aspect of the present disclosure, a flight control system and associated method are described for selective automatic control of the flight of a helicopter that is capable of flying in a hover, which hover is characterized by a set of orientation parameters including a pitch orientation, a roll orientation, a yaw orientation and a position above the ground. In embodiments, a MEMS sensor arrangement is supported by the helicopter for generating a pitch rate signal that is responsive to changes in said pitch orientation, a roll rate signal that is responsive to changes in the roll orientation, a yaw rate signal that is responsive to said yaw orientation, and acceleration signals responsive to the hover. A magnetometer generates a magnetic heading signal. A GPS receiver is supported by the helicopter for generating a position signal, a speed signal and a course signal responsive to the hover of the helicopter. A processing arrangement is supported by the helicopter for receiving a set of inputs consisting of the pitch rate signal, the roll rate signal, the yaw rate signal, the acceleration signals, the position signal, the speed signal, the course signal, and the magnetic heading signal to determine a true attitude of the helicopter and to generate a set of control signals to maintain a stable hover of the helicopter according to a selected hovering position. An actuator arrangement for receiving the set of control signals to adjust the hover of the helicopter based on the set of control signals. In an embodiment, an aircraft pressure-based altitude sensor signal or a GPS-based altitude signal can be used to indicate a current offset from a desired altitude.

In yet another aspect of the present disclosure, an autopilot system and associated method are described for a helicopter. An inner loop is configured at least for providing a true attitude for the flight of the helicopter including a given level of redundancy applied to the inner loop. An outer, autopilot loop is configured for providing at least one navigation function with respect to the flight of the helicopter and wherein the inner loop and the outer loop are each configured with triplex processors.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 11 is a chart that illustrates autopilot flight modes in terms of the various sensor inputs that are employed for control purposes.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings may not be to scale and may be diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
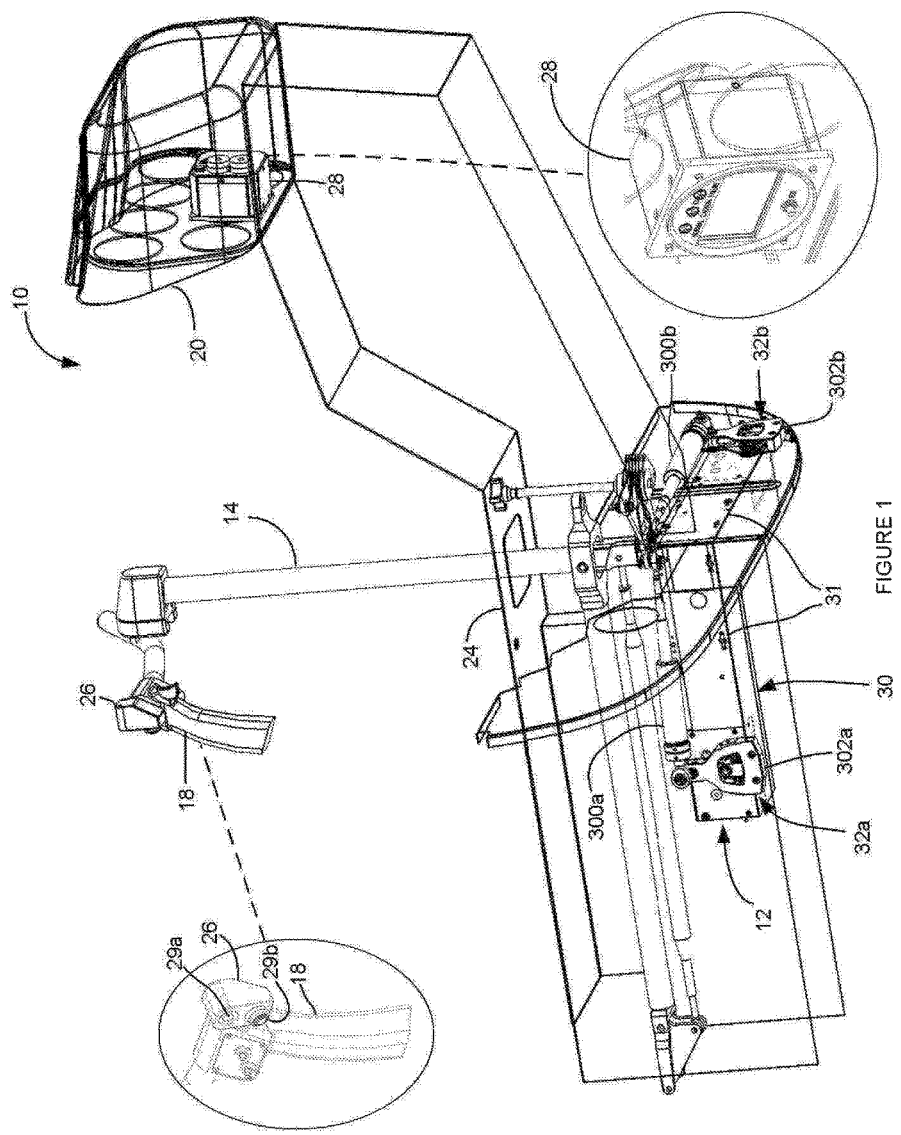
FIG. 1 is a diagrammatic perspective, partial view of a helicopter including components of an autopilot according to the present disclosure.

FIG. 1 is a perspective, partial view of a helicopter 10, shown here for purposes of illustrating various components of an embodiment of an autopilot system 12 in relation to the helicopter. It should be appreciated that much of the physical structure of the helicopter itself has been rendered as invisible in FIG. 1 for purposes of illustrative clarity, however, it is understood that this structure is present. The autopilot of the present disclosure is electromechanical and can provide flight control of a helicopter without requiring a hydraulic flight control system. The helicopter can be, by way of non-limiting example, a Robinson R22 helicopter. The teachings that are brought to light herein, however, can readily be adapted for use with any suitable helicopter, either currently available or yet to be developed. For example, the autopilot of the present disclosure can be used with helicopters having hydraulic cyclic assistance, as will be further described below.

Helicopter 10 includes a stick or cyclic 14 having a control handle or grip 18 that is configured for engagement with the hand of a pilot. As will be appreciated by one of ordinary skill in the art, stick 14 can be moved fore and aft (toward and away from an instrument console 20) to control pitch of the helicopter and transversely for purposes of controlling roll of the helicopter in a coordinated manner to produce controlled flight. Additional control inputs are provided by the pilot via a pair of pedals in order to control the yaw orientation of the helicopter by changing the pitch of a tail rotor. It is noted that these yaw orientation control components have not been shown for purposes of illustrative clarity but are understood to be present. In an embodiment, the pilot also remains in control of the collective of the helicopter as well as the throttle settings. The autopilot of the present disclosure, however, can exert full control authority over stick 14 by moving the stick in any direction to the limits of its travel under appropriate circumstances. Stick 14 passes below a deck 24 of the helicopter and engages pitch and roll linkages of the helicopter in a manner that is familiar to one of ordinary skill in the art so as to control cyclic actuation of the main rotor of the helicopter. The term "cyclic" refers to the variation in pitch of the rotor blades of the helicopter on a per revolution basis. In this regard, cyclic control can refer to manipulation of the stick or the stick itself can be referred to as the cyclic. An autopilot display processor unit (ADPU) 28 can be mounted in instrument console 20 to provide indications to the pilot as well as to provide processing capability and other capabilities, as will be further described.

The cyclic, in particular, handle 18 includes a Switch Module Assembly 26 that can be mounted as shown. Details of handle 18 are shown in a further enlarged inset view. The switch module can contain switches including an engage/disengage switch 29a and a trim/mode "top-hat" switch 29b (4-way). The top-hat switch allows the pilot to trim the course, speed, position, and altitude. Depressing the top-hat switch to simultaneously actuate more than one switch can select a highlighted mode. There can be a time-out feature in the autopilot processor which prevents switch faults or wiring faults from causing continuous trimming. The mode switch can select and deselect altitude, speed, hover or position hold modes based on current flight condition. It is noted that, for purposes of the present disclosure, a hover mode can be referred to interchangeably as a position mode hold since there is no requirement imposed herein for the autopilot to control the collective of the helicopter and/or the foot pedals.

Still referring to FIG. 1, autopilot 12 implements cyclic control through a number of component assemblies that are appropriately located on the helicopter. A main autopilot unit 30 is located below the main deck of the helicopter. In the present embodiment, main unit 30 includes an L-shaped enclosure 31 that supports electronics as well as a pitch control actuator linkage 32a and a roll control actuator linkage 32b, which may be referred to generally or collectively by the reference number 32. Each of these linkages includes an actuator that is located within the main unit enclosure, as will be further described. A distal end of each of the linkages engages the lowermost end of stick 14 to implement what is known as a parallel control system. In this regard, it should be appreciated that the original cyclic control linkages of helicopter 10 between stick 14 and the rotor remain intact. That is, inputs from the helicopter pilot as well as the autopilot are input directly to the stick. Details with respect to the pitch and roll control linkages provide for a parallel control input arrangement. A series type autopilot control system, in contrast, requires breaking the original cyclic control linkages of the helicopter between the stick and rotor such that the autopilot actuators can be inserted into the break. It should be appreciated that the teachings herein can readily be adapted to a series control input embodiment.

Figure 2:
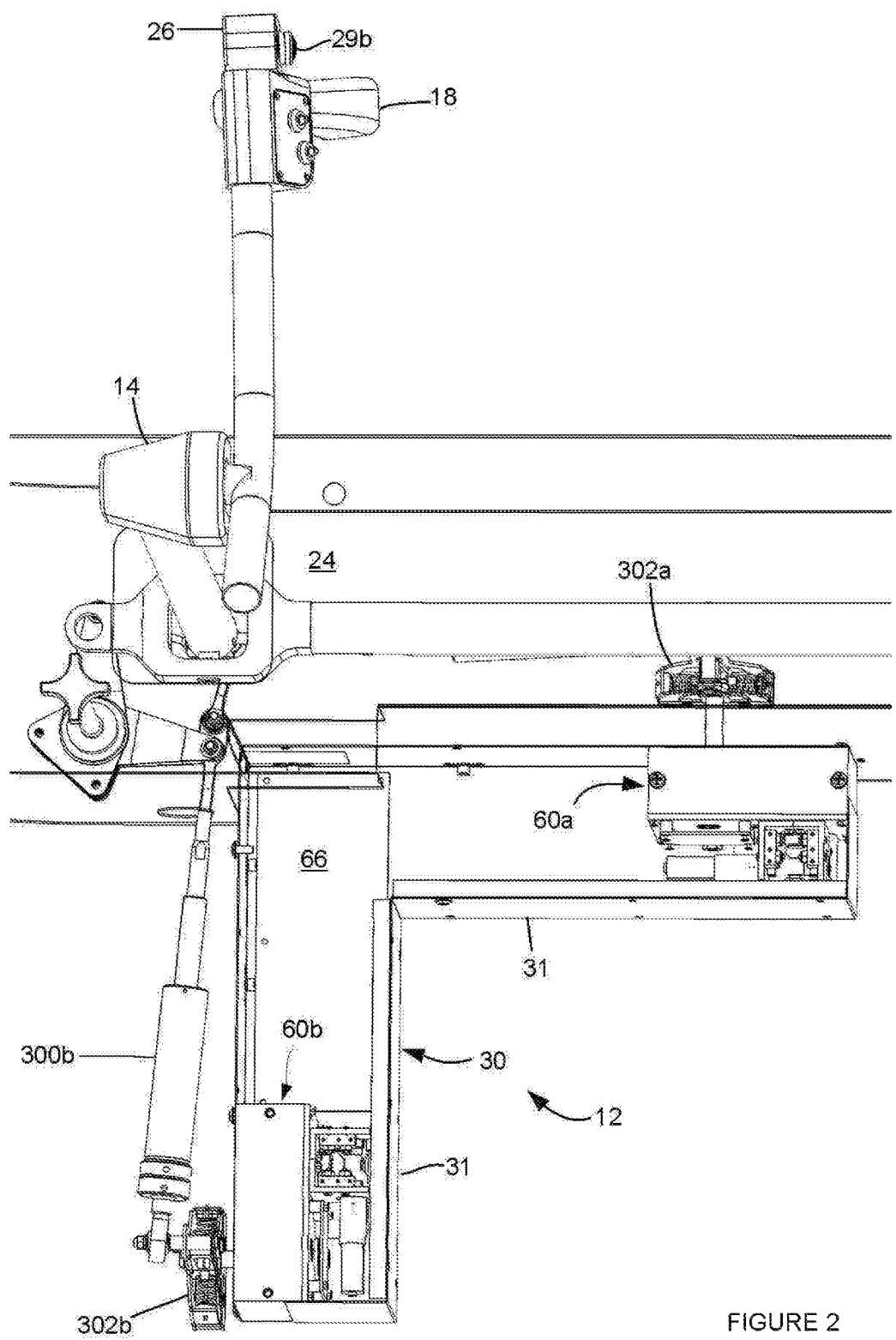
FIG. 2 is an overhead diagrammatic perspective, partial view of the helicopter of FIG. 1, shown here to illustrate further details with respect to components of the autopilot system.

Turning to FIG. 2, components of the helicopter and autopilot are shown in an overhead perspective view. In this view, a pitch actuator 60a and a roll actuator 60b (which may be referred to generally or collectively by the reference number 60) can be seen within L-shaped enclosure 31 with the lid of the enclosure rendered transparent. Main unit electronics 66 are located within the enclosure and are suitably electrically interfaced (not shown) both externally and to the actuators.

Figure 3:
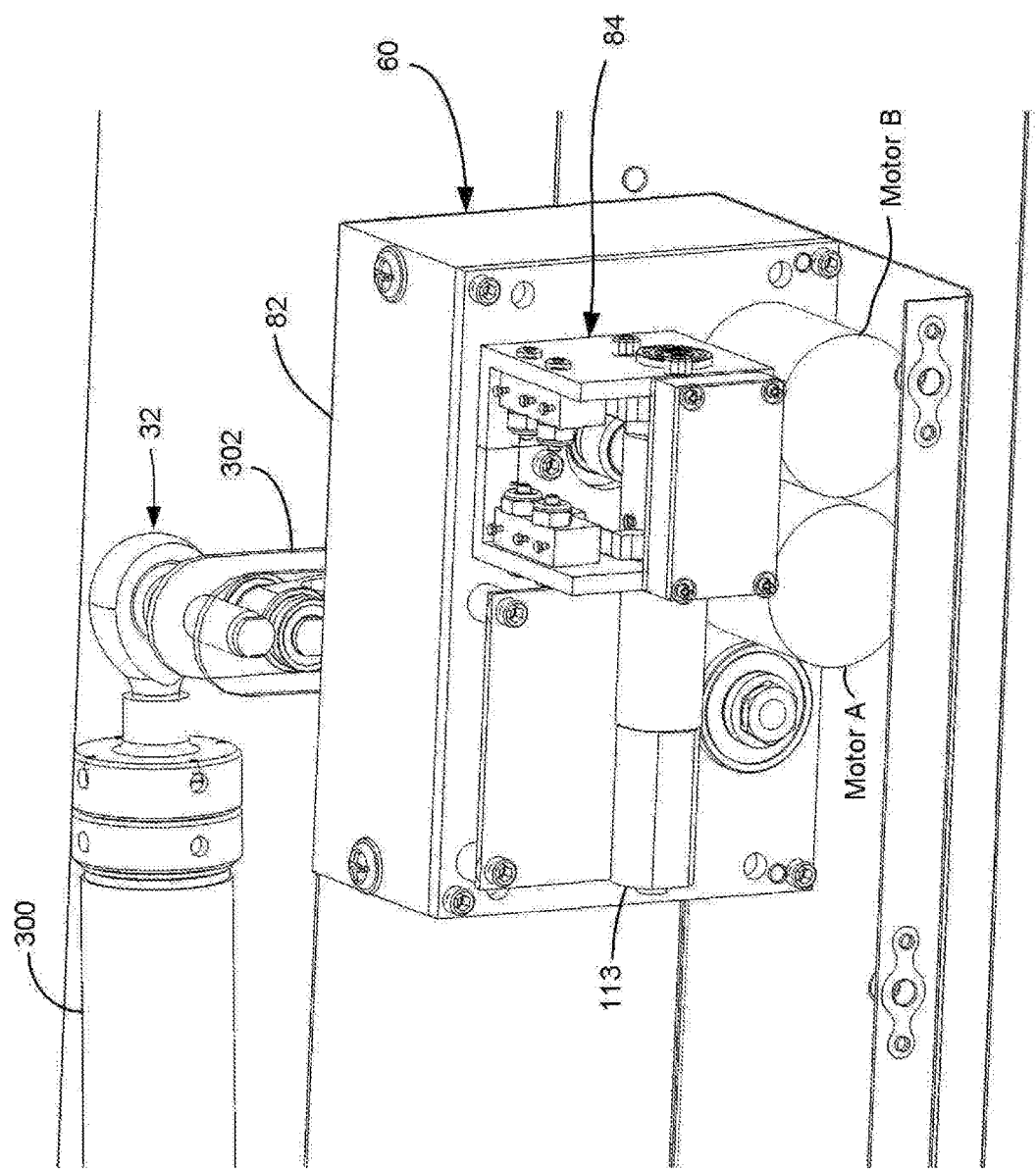
FIG. 3 is a diagrammatic, perspective cutaway view of an embodiment of an actuator and an embodiment of a force limited link that can serve as components of the autopilot of the present disclosure.

Referring to FIG. 3, an embodiment of actuator 60 that can be used for the pitch and roll actuators throughout this disclosure is seen in a perspective view installed within enclosure 31 and connected to a control linkage 32. Each actuator includes a housing 82 having a gear arrangement, yet to be illustrated, within the housing, dual motors Motor A and Motor B, and a clutch arrangement 84 for selectively engaging and disengaging the motors to rotate an output shaft which is not visible on the opposite side of housing 82. As will be seen, the gear arrangement allows motors A and B to simultaneously drive the output shaft or either one of the motors to individually drive the output shaft. In the present embodiment, motors A and B are brushless DC motors having a Y stator winding configuration which requires coordinated inputs to drive the motor phases in a particular sequence. As such, the motors cannot runaway under their own power. The motors include Hall effect sensors that are used for purposes of timing electrical drive pulses to the stator of the motor. Further details with respect to the motors and related drive considerations are provided at one or more appropriate points hereinafter. While the present disclosure has been framed in terms of the use of brushless DC motors having a Y stator coil by way of example, it should be appreciated that any suitable type of electric motor can be used.

Figure 4:
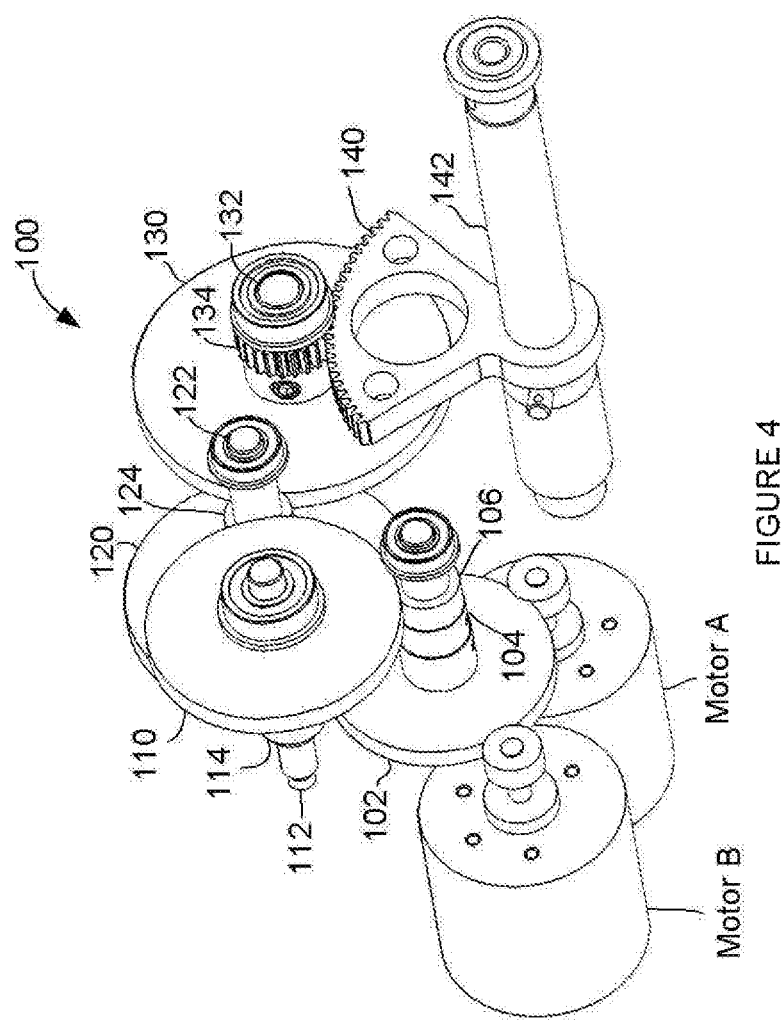
FIG. 4 is a diagrammatic, perspective view of an embodiment of a gear drive arrangement that can form part of the actuator of FIG. 3 along with a redundant pair of actuator drive motors.

FIG. 4 illustrates an embodiment of a gear drive arrangement 100 that can be used in the actuator of FIG. 3. Initially, it is noted that the gear drive arrangement is a multi-stage reduction drive, for example, on the order of about 1750:1. Also, teeth have not been illustrated on a number of the gears to be described, but are understood to be present. Other embodiments may not require gears with teeth. Motors A and B have output shafts supporting gears that engage a gear 102 on a first shaft 104. An opposing end of shaft 104 supports a smaller gear 106 that drives a gear 110 that is supported on a second shaft 112 which also supports a smaller gear 114 (partially hidden in the view of the figure). It is noted that shaft 112 can comprise a clutch shaft that can move laterally to selectively engage or disengage the actuator motors from the remaining gears of the gear drive. A suitable clutch arrangement is described, for example, in U.S. Pat. No. 7,954,614 which is incorporated by reference. The clutch arrangement relies upon movement of the clutch shaft along its elongation axis by using a permanent magnet that is mounted on a distal end of the shaft. A clutch actuator 113 (FIG. 3) can selectively move (for example, rotate) another permanent magnet in relation to the clutch shaft mounted permanent magnet such that the clutch shaft is magnetically biased to move between an engaged position and a disengaged position. The clutch shaft remains in a current operational position despite a power failure. Gear 114, in turn, selectively drives a gear 120 that is supported on a third shaft 122. The latter also supports a smaller gear 124 that drives a gear 130 that is supported on a forth shaft 132. The forth shaft, in turn, supports a smaller gear 134 which is arranged to rotate an output gear 140 that is supported on an output shaft 142 of the actuator. The output gear is configured to provide sufficient rotation to move stick 14 through its full range of motion. In an embodiment, the actuators of the present disclosure are sufficiently robust, in terms of the generated level of actuation force, so as to be capable of controlling the cyclic of a hydraulically equipped helicopter using a failed hydraulic system. In the present embodiment, the actuator is capable of producing 600 inch-pounds or 50 food-pounds of torque. Further, in the present embodiment, using a 2 inch actuator arm, this provides for the capability of applying forces of up to 300 pounds to the bottom of the cyclic. While the present embodiment has been designed to provide actuation forces at this level, it should be appreciated that in another embodiment, significantly higher or lower forces can be provided by varying any of: the motor output torque, the gear-train reduction ratio, or the actuator arm length. As seen in FIGS. 1 and 2, the actuator forces are applied to the bottom of the cyclic whereas pilot forces are applied to the top of the cyclic. Accordingly, the pilot is provided with a mechanical advantage due to the different lever-arm lengths. On the R22 helicopter, the mechanical advantage that the pilot has at the top of the stick compared to the bottom of the stick where the actuators are attached is roughly 7:1. In such a case, an actuator applied force of 300 pounds is equivalent to about 43 pounds of pilot applied force. Similarly, while the actuator can generate very large forces, the force-limited-link that is described below generally will not transmit forces of such a magnitude through to the base of the cyclic, unless a much stiffer force-limited link is installed.

In an embodiment, the autopilot can determine, based on sensor inputs, the status of the hydraulic control system of the helicopter as one of a normal mode and a failed mode. In the normal mode, the inner loop can generate actuator motor control signals based on a first, normal set of parameters. In the failed mode, the autopilot can generate actuator motor control signals based on a second, failure set of parameters. The failure parameters can address any change in control that is introduced by the loss of hydraulic assistance for purposes of cyclic actuation. For example, compensation for a dead zone or hysteresis zone can be accommodated. As another example, compensation can be introduced to account for limit cycling that can occur in the dead zone such as, for instance, automated dithering. These parameter sets, among others, can be stored in appropriate memory that is accessible by the MCPs, as will be discussed below.

Figure 5:
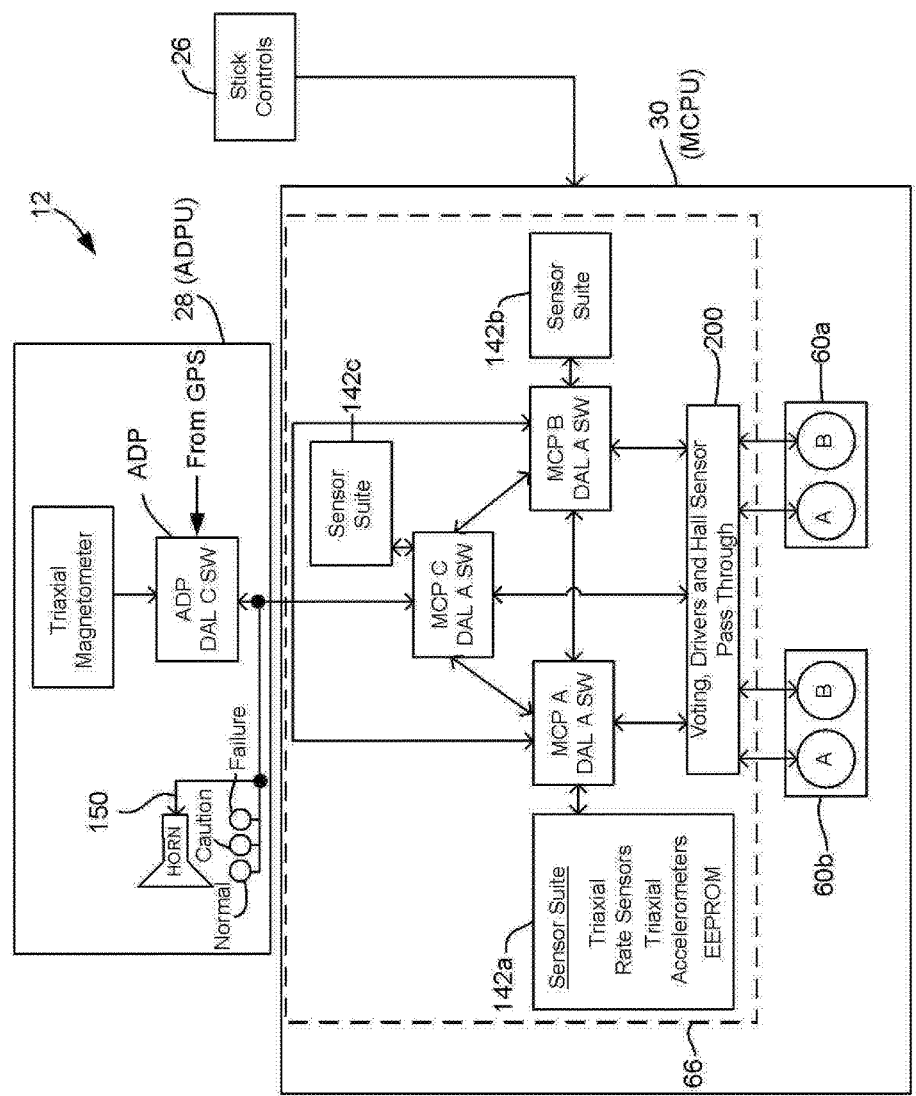
FIG. 5 is a block diagram that illustrates an embodiment of the autopilot of the present disclosure.

Having described the mechanical components of the autopilot in detail above, it is now appropriate to describe the autopilot in terms of the relationship between the afore-described components and related control electronics. In particular, FIG. 5 is an embodiment of a block diagram of autopilot 12. In this regard, main unit 30 comprising enclosure 31, the pitch and roll actuators 60 and electronics 66 may be referred to hereinafter as the Motor Control Processor Unit (MCPU) or main autopilot unit 30. The MCPU includes three microprocessors, each of which may be referred to as a Motor Control Processor (MCP). There are three MCPs, individually designated as MCP A, MCP B and MCP C. These processor units each access a dedicated sensor suite of tri-axial MEMS rate sensors and tri-axial MEMS accelerometers indicated by the reference numbers 142a, 142b and 142c, respectively. In the present embodiment, each of these sensor suites is identically configured. The MCPs are used to provide an inner loop of an overall control system having an inner control loop and an outer control loop. The MCPs provide commands to brushless DC motors, Motor A and Motor B of pitch actuator 60a and roll actuator 60b, driving the control system for the helicopter. All inter-processor communication can be through a serial bus that is natively supplied on each of the processors. Data integrity can be protected, for example, through the use of a cyclic redundancy check (CRC) incorporated into the data stream.

The Federal Aviation Administration certifies airborne system software under a version of DO-178. At the time of this writing, DO-178C has been released. This document specifies Design Assurance Levels (DALs) based on the criticality of software failure in a given system. For example, DAL A is designated as "catastrophic" and is assigned where a failure may cause a crash. As another example, DAL C is designated as "major" and is assigned where a failure is significant and may lead to passenger discomfort or increased crew workload. In the present embodiment, each one of the three MCPs can execute identical DAL A software to constitute a triple-redundant system. The motor control processors are interconnected so that they can share data. Each processor reads its sensor suite and compares its data with sensor data coming from the other two processors for purposes of consistency and each motor control processor computes averages of all the corresponding sensors to use for further processing. In another embodiment, median values can be determined, as opposed to averages. Sensor data determined to be erroneous is eliminated from having an influence on the median. Generally, detection of a failure of a sensor (as opposed to the presence of random noise) can be accomplished by subjecting sensor data from each of the three sensor suites to low-pass filtering to remove noise. The filtered outputs are compared against one another for consistency, if one of the filtered results is significantly different (e.g., outside of a predetermined threshold) from the other two results, the sensor associated with the data can be declared to have failed. Rate gyro failure detection can be accomplished in a similar fashion with the additional step of passing the gyro data through wash-out filters prior to the low-pass filters in order to remove bias or drift effects. Once processed through the two filters, the gyro data outputs can be compared against one another for consistency, and any gyro producing an outlying value can be declared to have failed. A warning signal of sound and/or light can be sent to autopilot display processor unit (ADPU) 28 on instrument panel 20 (FIG. 1). Haptic feedback such as, for example, stick shaking can be used alone or in combination with other warning signal indications. In an embodiment, an annunciation section 150 can include status lights, best seen in the enlarged inset view of the ADPU in FIG. 1, include green (normal), amber (caution) and red (failure), as well as dual warning horns to provide system status indications. The warning horns also provide system status notifications and alarms along with the status lights. Both the status lights and horns interface directly to the MCPs. In some embodiments, sounds and/or warnings can be transmitted over the helicopter audio system such that notifications can be heard in the pilot's headset as well as being issued from the ADPU. Complementing the status lights and horns is a display which provides current autopilot system settings such as engagement status, course, slaved gyroscopic heading, speed over ground and any warning messages. Also on the panel is a testing button which initiates an Initiated Built-In Test (IBIT).

Autopilot 12 can be configured to generate actuator control signals based on the set of sensor signals that is used by the MCPs to control the flight of the helicopter in a pilot-selected one of a plurality of flight modes. The MCPs can further generate a slaved gyro output signal based on no more than the same set of sensor outputs. As will be seen, an autopilot display can be configured to display autopilot flight mode information to the pilot while displaying a slaved gyro output to the pilot based on the slaved gyro output signal. The autopilot display can be provided on a single screen, although this is not required, that simultaneously displays the autopilot flight mode information and the slaved gyro output. In one embodiment for producing the slaved gyro output, the sensor arrangement includes a yaw rate gyro that produces a yaw rate output. The MCPs are configured to integrate the yaw rate output to produce a yaw heading. Because the yaw rate gyro can exhibit significant drift, especially when a MEMS rate sensor is used, the MCPs periodically update the yaw heading to compensate for the yaw rate drift. In an embodiment, the sensor arrangement includes a GPS that produces a GPS course and the processing arrangement periodically updates the yaw heading based on the GPS course. In another embodiment, the sensor arrangement includes a magnetometer arrangement that produces a magnetic heading signal and the processing arrangement periodically updates the yaw heading based on the magnetic signal heading.

In another embodiment for producing the slaved gyro output, the sensor arrangement includes a triaxial rate gyro and a triaxial accelerometer and the processing arrangement is configured to generate a helicopter attitude including a yaw heading. The attitude can be determined by an inner loop on an essentially instantaneous basis using the set of sensor outputs. In one embodiment, attitude can be monitored or tracked by the inner loop based on integration of the outputs of rate sensors. In another embodiment, the inner loop can determine the helicopter attitude based on a direction cosine matrix. The latter can be referred to interchangeably as a rotation matrix that characterizes one frame of reference relative to another frame of reference in terms of a rotation. Rate sensor gyro inputs are used as an integration input to determine the attitude of the helicopter. In this regard, all determinations can be made in terms of vector cross products and dot products. In still another embodiment, quaternions can be used for purposes of determining the attitude of the helicopter. In either case, since the determined yaw heading is subject to a yaw rate drift that is exhibited by the triaxial rate gyros, the processing arrangement is configured to at least periodically adjust the yaw heading to compensate for the yaw rate drift and produce the slaved gyro output. The yaw heading can be periodically updated based on either magnetic heading or GPS course.

The MCPs also read Hall sensor data from the actuator motors, which can be used to indicate the current position of each actuator, and a command signal coming from an autopilot display processor (ADP) which forms part of the ADPU. In this regard, the ADPU serves as the outer control loop to provide command signals to the inner loop. Using all these data, each MCP calculates a control signal for the motors in terms of a PWM (Pulse Width Modulation) and direction of rotation. Each processor also uses the Hall sensor data to control the power connections to the armature of the brushless motors assigned to it. Each MCP compares its PWM command signal and rotation direction for the pitch and roll actuators with commands generated by the other two MCPs for agreement. Since all processors are using the same data to compute motor commands, they should produce identical output signals. Signals for agreement/disagreement with the other two processors are sent to a voting section 200 that will disable control input capability of any MCP that is in disagreement with the other two MCPs. In the present embodiment, voting section 200 has been implemented in hardware, however, software embodiments can readily be implemented.

Attention is now directed to further details with regard to actuators 60 with initial reference to FIG. 3. It should be appreciated that for a gear ratio of 1750:1, one revolution of motor A and/or motor B rotates the actuator output shaft by only about 0.2 degrees. In and by itself, this resolution can be sufficient for monitoring the actuator output position. For example, rotation of the motor shaft can be detected using a magnet that is mounted on the shaft, as is familiar to one having ordinary skill in the art. In an embodiment, however, Hall sensor data from the motors can be used to determine the incremental position of the actuator output shaft of each actuator. In this regard, each actuator motor includes 3 Hall sensors. The Hall sensor pulses can act like an incremental up/down counter. The position of the arm/output shaft relative to a reference location can be tracked constantly. For example, a zero reference position of the actuator output shaft can be defined when the actuator is engaged via clutch 84. Such zero reference position tracking can be used for certain failures wherein the best approach resides in restoring the actuator shafts to their averaged positions prior to the failure. Since each motor includes 3 Hall sensors and 4 poles, there are 12 Hall state changes per revolution of each motor. Remarkably, by monitoring the Hall state changes, resolution can be increased by a factor of 12 such that a resolution of about 0.017 degrees is provided at the output shaft of the actuator. In an embodiment, a corresponding movement at the top of the stick in FIG. 1 can be about 0.004 inch.

As described above, each actuator includes motor A and motor B. Each individual motor is controlled by one MCP. Thus only MCP A and MCP B control motors. In particular, MCP A controls motor A in each of pitch actuator 60a and roll actuator 60b, while MCP B controls motor B in each of pitch actuator 60a and roll actuator 60b. MCP C (the third processor) does not control a motor but performs all calculations to generate stick commands as if it were controlling a motor. In this regard, a third motor can readily be added to each actuator (see FIG. 4) that would engage gear 102 in the same manner as motor A and motor B, but responsive to MCP C. The latter, however, votes in a manner that is identical to the other two processors. For example, if MCP A and MCP C agree on the control of the pitch motor, but MCP B does not, then MCP B will be voted out from control of its pitch motor, MCP B will still control its roll motor unless MCP A and MCP C also vote out control of that motor. On the other hand, if MCP C is voted out, no actuator motors will be affected, but a warning light and horn can be actuated as would be the case for the MCPs which control motors. Further details with respect to this architecture are provided hereinafter.

The actuators are designed such that either one of motor A or motor B is independently capable of driving the actuator to control the helicopter. The output shaft of a failed motor will be rotated by the remaining motor. If one of MCP A or MCP B is voted out, the autopilot can continue to function despite the fact that each of these MCPs controls motors. As stated, there can be a warning light and a brief sounding of the horn to notify the pilot that there has been a non-critical autopilot malfunction.

The MCPs have full authority over the controls and are rate limited only by the natural response of the system which is about 5 inches per second. The MCP control section is the only portion of the autopilot that can create a critical or major hazard malfunction at least in part due to the rate of stick motion. Accordingly, the MCPU is designed as triple-redundant with DAL A designated software for purposes of operating the inner loop of the autopilot. These factors greatly reduce the probability of a critical failure. Applicants recognize, however, that the software corresponding to the outer loop can be partitioned from the inner loop software in a way that can allow the outer loop software to be designated at a different design level assurance than the inner loop. In the present embodiment, a lower DAL C certification has been applied to the outer loop software since the latter cannot cause a critical failure. In this regard, the outer control loop retains more limited authority than the inner loop. That is, the outer loop can command only small, rapid actuator motion and slow large actuator motion. The inner loop, in contrast, can provide rapid changes in response to gusts and other sudden changes in attitude while the outer loop changes are designed to hold navigation target parameters and trim requirements. In this regard, the frequency responses of inner and outer control loops are separated from one another such that the two loops do not interact to produce oscillations. That is, even with an outer loop failure, the helicopter will continue to hold attitude which, with proper warnings from the horn and lights, is a benign failure. In another embodiment, the outer loop software, like the inner loop software, can be certified under DAL A. Further, the outer loop of the present embodiment includes a lower level of hardware redundancy, as will be seen.

The outer loop software is handled by the ADP (Autopilot Display Processor) in ADPU 28. The MCPs convert requested autopilot commands from the ADP into actuator control signals that can drive the actuator motors within defined operational limits. In this regard, it should be appreciated that DAL A software is handled by the triple redundant MCPs while DAL C, outer loop software is handled by a completely different processor. By way of still further explanation, a single executable runs on each MCP. The MCPs, which may be referred to as triplex processors, can execute identical software. Thus, the autopilot control laws are partitioned between the ADP and triplex processors. The ADP processes the outer loop dynamics and autopilot modes while the triplex MCPs process the inner loop dynamics. Outer loop control laws relate to navigation functions while inner loop control laws relate to attitude control on an at least essentially instantaneous basis. The ADP further provides the pilot's graphical and testing interface to the autopilot and executes the autopilot control laws to determine actuator commands based on sensor and GPS data. Accordingly, this processor interfaces directly with a GPS and triaxial magnetometers, and indirectly with triaxial accelerometers and triaxial rate gyros of the MCPs which provide the roll rate, roll attitude, pitch rate, pitch attitude, position, altitude, ground speed, course, yaw rate, accelerations, and heading data. The ADP monitors the health of these sensors but does not check the validity of the data. The IBIT test switch also interfaces to the ADP. In another embodiment yet to be described in detail, the ADP can be designed in the same manner as the MCPU with triple redundancy. With both the MCPU and ADP in a triple redundancy configuration, the autopilot can tolerate a single failure in either or both units and still remain fully functional. When a triple redundancy design is employed in both inner and outer loops, a fail-functional design results. Therefore, a component in the inner loop such as, for example, an MCP (triplex processor) or the outer loop such as, for example, a triplex ADP processor, can fail and the autopilot will nevertheless remain fully functional.

The MCPs accept data from the ADP which can include commands as well as data from an external GPS. The data can be screened by each MCP to detect errors or malfunctions. The control command is rate-displacement limited by the MCPs. The MCPs will not allow a command from the ADP to create a hazardous response from the helicopter. GPS data is used by the ADP. The GPS and magnetometer data are both used in the MCPs to remove drift errors associated with the rate sensors of each sensor suite and to determine roll, pitch and heading. The GPS data can also be checked for errors.

The MCPs constantly monitor for both internal and external faults. In the event of an ADP failure, any one MCP can immediately recognize the situation based on update rate and control signal conformity. In response, the MCPU, in one embodiment, will then cause the inner loop to hold the helicopter straight and level. In another embodiment, the MCPU can act in the manner of a SAS (Stability Augmentation System) or a dead reckoning system and control the helicopter based on internal rate signals. The MCPs will attempt to hold attitude and also actuate a horn and light to indicate a failure. It has been empirically demonstrated that the helicopter can maintain prolonged flight with only MCP control, providing more than ample time for the pilot to take control and disengage the autopilot. The ability to detect excessive autopilot response resides in the triplex motor controllers as detailed herein. The triplex processors monitor sensors and also check to confirm that calculated responses are within limits. Pitch and roll commands from the ADP are limited based on such command filtering by each of the triplex processors. Each triplex processor can detect whether a limit has been exceeded and can initiate safe shut down of the autopilot. Pitch and roll axes commands can be monitored identically but with different limit values. The monitors are dynamic; that is, the limit values can be frequency/rate dependent. Redundancy management features for each axis can include stick rate limiting and body rate monitoring.

Each MCP processor can be provided with an independent power supply. A total power failure of the helicopter's electrical power system can cause the actuators to lock in position for about five seconds using a dynamic braking feature that is described in detail below. This five second time period is sufficient for the pilot to take over control. In this regard, the autopilot does not let the cyclic stick flop over by releasing control responsive to a power failure to the autopilot. Even though the actuators are locked, however, the pilot can still perform control over the helicopter since there are override or force limited links 300a (pitch, seen in FIG. 1) and 300b (roll, seen in FIGS. 1 and 2) between each actuator and the cyclic stick. These links are rigid for forces below an unseating value and compliant at higher forces to allow the pilot to safely maneuver and land the helicopter even if disengagement of the system cannot be achieved. It has been empirically demonstrated that a pilot can control the helicopter, including hovering and landing, with both actuators in what is referred to as a "locked" state. The locked state is provided by shorting all windings of the actuator motors and is used in a dynamic braking embodiment described below. The override links are described in detail in commonly owned U.S. patent application Ser. No. 13/763,590 which shares the filing date of the present application and is incorporated herein by reference. In a helicopter that does not utilize a hydraulic interface to the cyclic, cyclic vibration isolators 302a (pitch) and 302b (roll) can be located on the output shaft of each actuator. The vibration isolators may be optional for use with a helicopter having hydraulic cyclic control since the hydraulic system generally provides damping of cyclic oscillations. The vibration isolators reduce the two per revolution oscillating motion that is present in the R22 rotorcraft control linkage and other light helicopters, to prevent vibratory loads on the rotorcraft control and to increase the fatigue life of the actuator components. The cyclic vibration isolators are described in detail in a separate patent application.

The sensor suite of each MCP can also include memory such as, for example, EEPROM or other suitable memory, as seen in FIG. 5. If there is an error detected by an MCP during operation, the error code can be stored in the EEPROM of the sensor suite associated with the MCP. The EEPROM can later be read in the context of determining the cause of failure. The EEPROMs can also contain parameters specific to the model of the helicopter in which the autopilot is installed such as, for example, control loop constants, sensor offsets and gains. As another example, the EEPROM can store different parameter sets for operation during normal hydraulically-assisted cyclic control and for operation responsive to detection that the hydraulic assistance system has failed.

Figure 6:
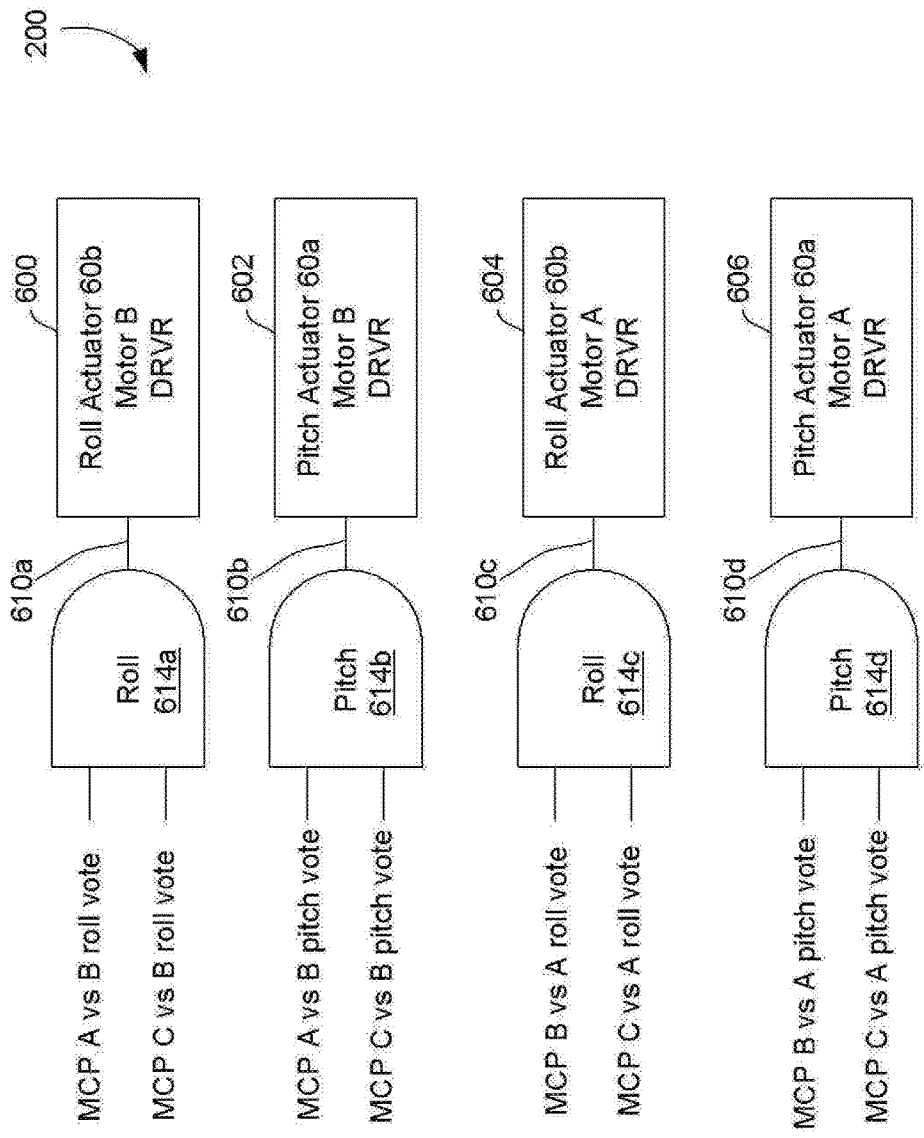
FIG. 6 is a schematic diagram of an embodiment of a voting section that receives votes which are cast by a set of triplex processors.

FIG. 6 is a schematic representation of an embodiment of voting section 200 of FIG. 5. It should be appreciated that one having ordinary skill in the art may readily implement a software version based on the hardware configuration that is shown. Main unit electronics 66 (FIGS. 2 and 5) includes an individual driver for Motor A and Motor B of each actuator. In particular, a first driver 600 drives Motor B of roll actuator 60b, a second driver 602 drives Motor B of pitch actuator 60a, a third motor driver 604 drives Motor A of roll actuator 60b and a fourth motor driver 606 drives Motor A of pitch actuator 60a. In this regard, each MCP generates separate commands for pitch and roll that are targeted for pitch and roll actuators 60a and 60b, respectively. For example, MCP A delivers pitch actuations to Motor A of actuator 60a and delivers roll actuations to Motor A of actuator 60b. For purposes of the present description, a logic high signal on disable inputs 610 of each driver (individually designated as 610a-610d) will result in disabling that driver, although any suitable logic scheme can be employed. During normal operation, these drivers operate in a manner that will be familiar to those of ordinary skill in the art with respect to driving the armature coils of brushless DC motors in timed coordination. As will be seen, the status for a given motor is determined independently, based on independent pitch and roll vote indications that are cast by the MCPs that do not control the given motor.

Still referring to FIG. 6, each motor driver disable input 610a-610d is electrically connected to a respective output of one of a set of two-input AND gates 614a-614d. Further, each AND gate 614 receives vote indications from the two MCPs that are not associated with the particular motor driver to which each AND gate is connected. For example, AND gate 614a, which can disable driver 600 for Motor B of roll actuator 60b, receives a first roll vote indication from MCP A that is designated as "MCP A vs B roll vote" to indicate that the vote is cast by MCP A for or against the command generated by MCP B. Similarly, AND gate 614a receives a second roll vote indication from MCP C that is designated as "MCP C vs B roll vote" to indicate that the vote is cast by MCP C for or against the command generated by MCP B. Thus, roll votes cast by MCP A and MCP C are individual indications by these two MCPs as to whether a current roll stick movement command being generated by each of MCP A and MCP C agrees or disagrees with the current roll stick movement command being generated by MCP B. In the present implementation, a vote by MCP A or MCP C against or in disagreement with the MCP B roll command is characterized as a high logic level. If only one of MCP A or MCP C casts a roll control vote against MCP B, only one input of AND gate 614a is logic high such that the output of AND gate 614a remains at logic low, which does not disable driver 600 to maintain Motor B of actuator 60b in a normal operational status. On the other hand, if both MCP A and MCP C cast a vote against roll control by MCP B, AND gate 614a will output a logic high level that disables motor driver 600 such that Motor B of roll actuator 60b is deactivated. Control of each of the remaining three motors is implemented in a manner that is consistent with the foregoing descriptions, as illustrated by FIG. 6.

Attention is now directed to further details with respect to the inner and outer control loops of the present disclosure. In an embodiment, the inner loop can be configured for providing control of one or more selected orientation parameters of the helicopter such as, for example, attitude hold including a given level of redundancy and/or software certification (e.g., DAL A) applied to the inner loop. It is noted that such an attitude hold embodiment may be referred to interchangeably as a true attitude embodiment, as will be further described. The outer autopilot loop can be configured for providing at least one navigation function with respect to the flight of the aircraft including a different level of redundancy such as, for example, a single processor as compared to the triplex processors of the inner loop and/or software certification such as, for example, DAL C as compared to DAL A for the inner loop. The redundancy and/or certification level applied to the inner loop can be greater than the redundancy and/or certification level applied to the outer loop. Based on the teachings that have been brought to light herein, any suitable combination of mechanical redundancy and software certification can be implemented for the inner and outer control loops. In this regard, an embodiment is described in detail below which employs triple redundant processing in both the inner and outer control loops. It should be appreciated that the architecture of the autopilot embodiments that is described herein provides for upgrades that can be limited to replacing a less critical portion of the system. For example, ADPU 28 of FIG. 5, in an embodiment, serves as the outer loop and can be certified as DAL C. This ADPU can be replaced or upgraded without affecting the inner loop. For example, an upgrade ADPU can add additional autopilot navigational modes and/or levels of hardware redundancy and/or levels of software certification.

Figure 7:
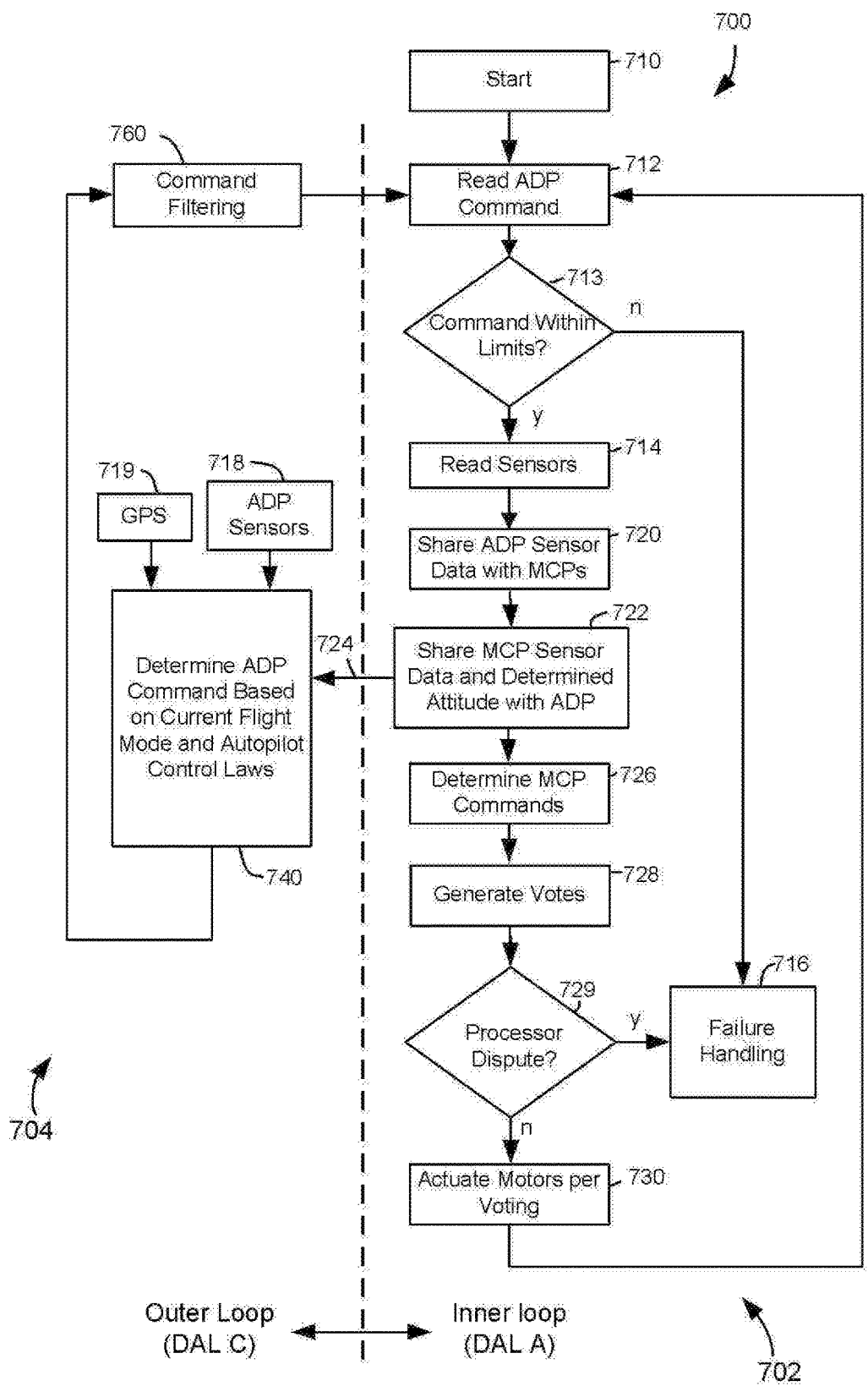
FIG. 7 is a flow diagram that illustrates an embodiment of a method for the operation of an inner control loop and an outer control loop of the autopilot of the present disclosure.

FIG. 7 is a flow diagram, generally indicated by the reference number 700, which illustrates an embodiment of a method for operating an inner loop 702 and an outer loop 704, as well as interaction between these loops. The method starts at 710 and proceeds to 712 which reads an ADP command that is passed from the outer loop, as will be further described. For the moment, it is sufficient to note that an ADP command is obtained for each iteration though the inner loop. An ADP command filtering decision is made at 713 as to whether the ADP command is within acceptable limits, for example, as described above. If the command is acceptable, operation proceeds to 714. On the other hand, if the command is not acceptable, operation proceeds to failure handling 716 which can initiate the issuance of warnings and/or shut down the autopilot. At 714, each MCP reads the sensors of its sensor suite (FIG. 5) while the ADP reads ADP sensors 718 and GPS 719. At 720, the ADP sensor data is shared with the MCPs. At 722, the MCPs share MCP sensor suite data (FIG. 5) with one another to form an average set of sensor data that is used by each MCP and which is shared with the ADP. Other suitable embodiments can determine a median set of sensor data. Further, the MCPs determine an attitude for the helicopter which is also shared with the ADP as indicated by a connection 724. At 726, each MCP determines actuator motor commands. At 728, voting is performed based on the commands, for example, using the hardware implementation of FIG. 6 or a software equivalent. At 729, the results of voting are compared. In the event that there is a processor dispute, operation transfers to failure handling 716. Any appropriate action can be taken as a failure handling depending on the voting results. For example, if control has been voted out for one motor of a particular actuator, that motor can be deactivated, as discussed above. Appropriate warnings can be issued. If step 729 does not identify a voting dispute, operation proceeds to 730, wherein the motors are actuated based on the voting.

Still referring to FIG. 7, attention is now directed to further details with regard to the operation of outer loop 704. It is noted that inner loop 702 and outer loop 704 execute in parallel. In this regard, at 740, the outer loop determines an ADP command that is based on the current flight mode and control laws for the particular rotorcraft in which the autopilot is installed. The control laws and related parameters can be customized on a per rotorcraft basis. The determination is based, at least in part, on rate data from the MCPs as well as an attitude for the helicopter that is generated by step 722 of the inner loop, taken in conjunction with data from ADP sensors 718 and GPS 719. At 760, command filtering is applied which serves to limit ADP commands for subsequent use by the inner loop. The current ADP command, subject to filtering, is then read by step 712. In this regard, it should be appreciated that step 726 applies command limiting to ADP commands, as described above.

Figure 8:
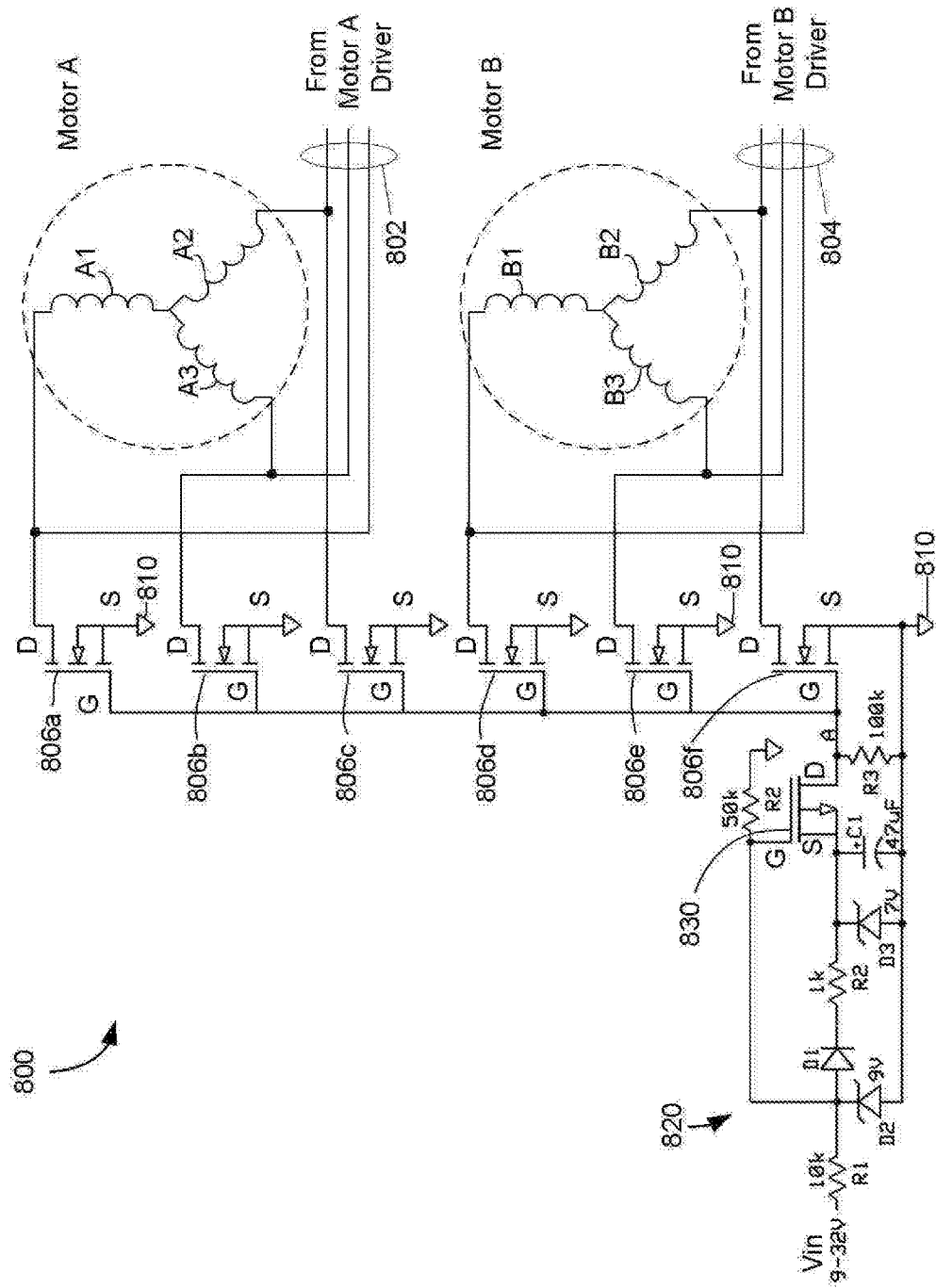
FIG. 8 is a schematic diagram of an embodiment of a dynamic braking system that can form part of the autopilot of the present disclosure.

FIG. 8 is a schematic diagram of an embodiment of a dynamic braking system, generally indicated by the reference number 800, that can be used, for example, with actuator 60 of FIG. 3. As described above, each motor can include a Y-connected stator. In particular, each motor includes three stator coils, designated as A1-A3 for Motor A and as B1-B3 for Motor B. For purposes of the present discussion, it should be noted that the motors are selected for characteristically exhibiting a resistance to rotation of the drive shaft of the motor in response to shorting or grounding the drive coils. Sets of motor driver lines 802 and 804 are connected to appropriate motor drivers, for example, as seen in FIG. 6. Each stator coil is also electrically connected to the drain terminal D of one of a group of six n-channel enhancement mode MOSFETs, individually designated as 806a-f and which can be referred to collectively as MOSFETs 806. The source terminal S of each of these transistors is connected to a ground 810. Accordingly, a positive voltage on a gate terminal G of these MOSFETs turns on each MOSFET such that the drain to source channel is essentially shorted, so as to function as a switch to connect or short the associated stator coil to ground. A drive circuit 820 receives input power from the helicopter, which is designated as $V_{in}$, and can comprise battery power from the helicopter for purposes of powering the autopilot. It should be appreciated that $V_{in}$ should reflect or match any failure of the power source that provides power to the autopilot. For purposes of drive circuit 820, the input power for proper operation can range from 9-32 volts DC. When power is present, during normal operation of the helicopter, a zener diode D2 regulates to 9 volts which biases the gate terminal of a p channel depletion mode MOSFET 830 to 9 volts. Current flows through a diode D1 and a 1K ohm resistor to another zener diode D3 which biases a source terminal of MOSFET 830 to 7 volts, also charging a capacitor C1 to 7 volts. Thus, $V_{GS}$ of MOSFET 830 is 2 volts DC such that the transistor is biased into an off state. Since MOSFET 830 is off, the drain terminal of this MOSFET is at zero volts which biases the gate of each of MOSFETs 806 to zero volts such that each of these transistors is also off. As will be seen, capacitor C1 acts as a power storage device that serves as a dynamic power source responsive to failure of the power source that provides $V_{in}$.

Still referring to FIG. 8, responsive to a power failure in which Vin goes to zero volts, the gate voltage of MOSFET 830 drops to zero volts which turns the transistor on. Once MOSFET 830 is on, it provides a discharge path for capacitor C1 to a 100K ohm resistor R3. This discharge current results in the application of a positive gate voltage to each of MOSFETs 806 such that these transistors turn on, thereby connecting the stator coils of motors A and B to ground as capacitor C1 discharges through R3. Accordingly, MOSFETs 806 will remain on based on an RC time constant that is determined primarily by capacitor C1 and resistor R3. In the present example, the time constant is approximately 4.7 seconds. In practice, MOSFETs 806 will remain on for about 4 seconds. While this time period can be varied through the selection of component values, it should be selected to provide for a period of time that is sufficient for the pilot to take over manual control from the autopilot. Even during the time period during which braking is applied, the pilot is able to take over and maintain control of the helicopter due to the presence of force limited links 300a and 300b, as described above and shown in FIGS. 1 and 2. One of ordinary skill in the art will recognize that the circuit of FIG. 8 can readily be modified and adapted in view of a particular installation. While the present embodiment has been described in terms of the use of MOSFETs, it should be appreciated that other embodiments can employ any suitable type of transistor using one transistor type or a suitable combination of different types of transistor types. By way of non-limiting example suitable transistor types include bipolar, JFET and IGFET among others.

Referring to FIG. 5 in conjunction with FIG. 8, it should be appreciated that two instantiations of the circuit of FIG. 8 are utilized. That is, one instance of the circuit of FIG. 8 is connected to the motors of each of the roll actuator and the pitch actuator. By temporarily shorting the motor coils to ground based on the time constant described above, resistance to rotation of the output shaft of each motor is produced. The degree of resistance is amplified by the gear arrangement of the actuator such that significant force is needed to move the stick from the position at which the power failure occurred. Empirical results have demonstrated that the stick will not flop over as a result of an autopilot power failure while allowing ample time for the pilot to take over control of the helicopter from the autopilot. It should be appreciated that dynamic braking, as taught herein, can be used with any motor that exhibits resistance in response to shorting at least selected drive coils.

Figure 9:
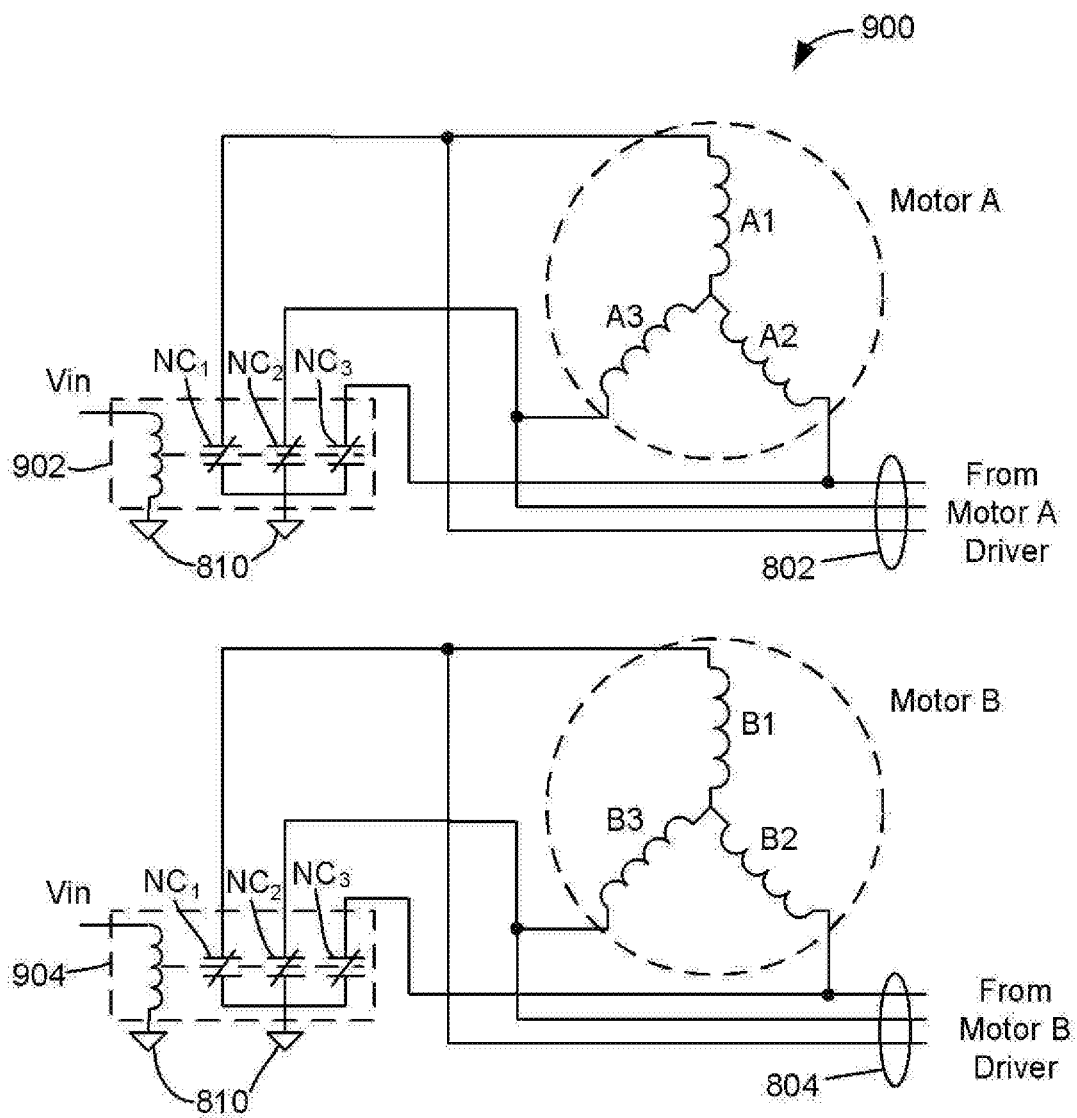
FIG. 9 is a schematic diagram of another embodiment of a dynamic braking system that can form part of the autopilot of the present disclosure.

FIG. 9 illustrates another embodiment of a dynamic braking system, generally indicated by the reference number 900, that can be used, for example, with actuator 60 of FIG. 3. In this embodiment, each motor winding is connected to one terminal of a normally closed contact, individually designated as $NC_1$, $NC_2$ and $NC_3$. The opposite terminal of each NC contact is connected to ground 810. Each of a first relay 902 and a second relay 904 includes a relay coil that is driven by Vin. While the present example illustrates the use of a 3 pole, single throw relay (having only normally closed contacts) in association with each motor, it should be appreciated that any suitable type of relay can be used. During normal operation, Vin is applied to each relay coil such that the normally closed contacts are in an open condition. If Vin is lost, however, the normally closed contacts close to connect each stator coil to ground thereby applying dynamic braking, as described above. Since the motors remain in a braked condition responsive to power failure, the pilot is able to take over and operate the helicopter due to the presence of force limited links 300a and 300b, as described above and shown in FIGS. 1 and 2.

While the above described dynamic braking embodiments have been framed in the context of applying braking forces to the cyclic, it should be appreciated that braking forces can be applied to any suitable control linkage to which an actuator motor is mechanically coupled without limitation. For example, dynamic braking can be applied to the tail rotor pedals of the helicopter. As another example, dynamic braking can be applied to the collective control. Further, some embodiments can employ dynamic braking without utilizing the actuator as part of an autopilot system.

Figure 10:
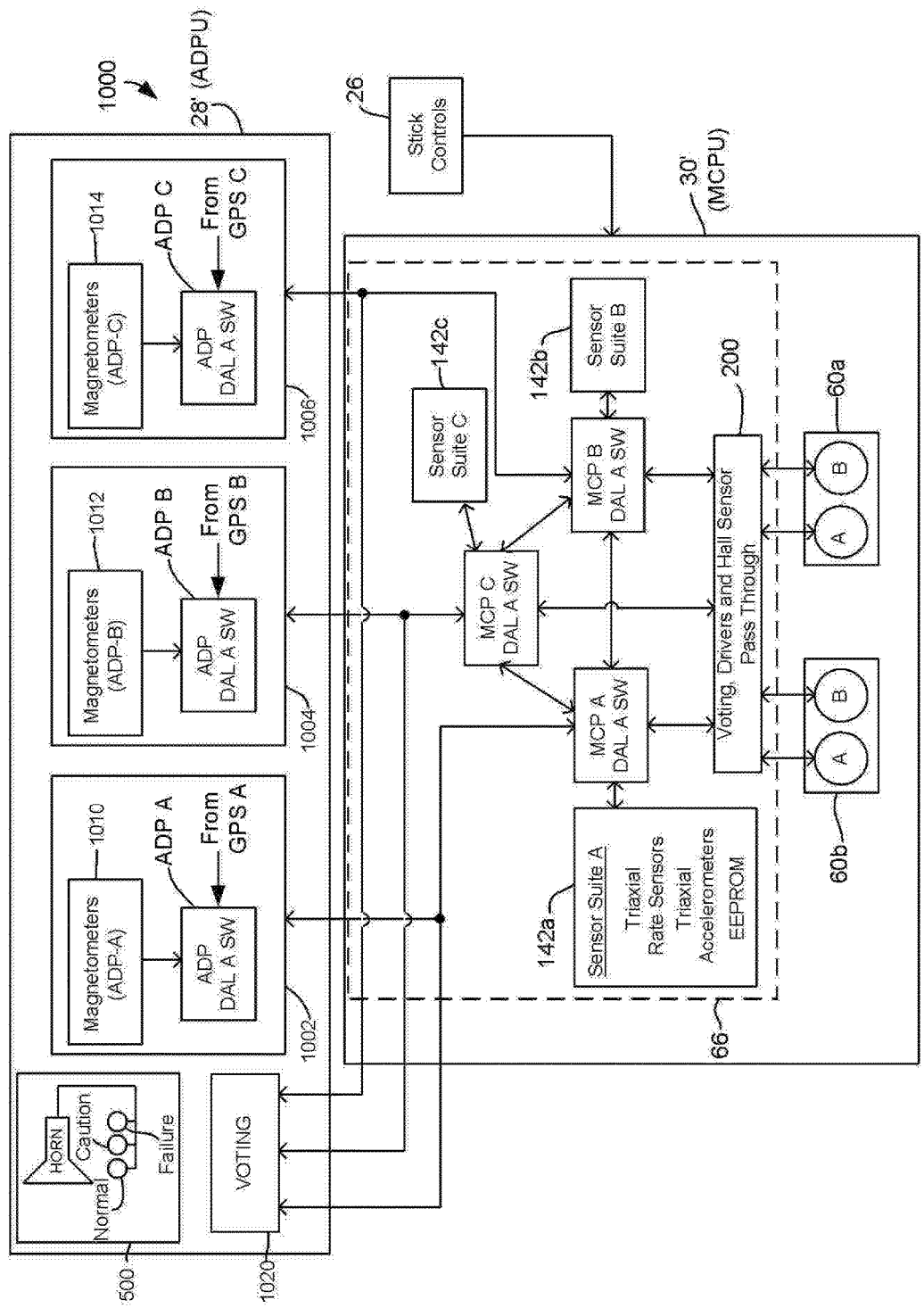
FIG. 10 is a block diagram of another embodiment of the autopilot of the present disclosure including a fail-functional design configuration that uses a triplex architecture in both the inner and outer loops.

Attention is now directed to FIG. 10 which is a block diagram that illustrates another embodiment of the autopilot of the present disclosure, generally indicated by the reference number 1000. To the extent that autopilot 1000 corresponds to previously described autopilot 12 of FIG. 5, descriptions of like components will not be repeated for purposes of brevity. The primary distinction with respect to autopilot 1000 resides in the provision of triplex ADP processing sections, as part of ADPU 28', that are designated by the reference numbers 1002, 1004 and 1006. MCPU 30' still includes triplex processors/MCPs but instead is configured to cooperate with the triplex ADPs. Each triplex ADP processing section includes a dedicated sensor suite designated as 1010, 1012 and 1014, respectively Like the ADP processing section of FIG. 5, the triplex ADPs operate based on control laws, for example, relating to navigational modes, while the MCPs handle control laws relating to instantaneous attitude control in a way that cooperates with the triplex ADPs to accomplish the various navigational control modes. In the present embodiment, each sensor suite includes a triaxial magnetometer. Further, in the present embodiment, each triplex processing section receives GPS inputs from a dedicated GPS unit. In other embodiments, two GPS units can be used in combination with other suitable data sources providing data such as, for example, airspeed and pressure-based altitude. In this regard, embodiments can accept commands from another navigation unit. Such commands can include, for example, roll and steering commands. In some embodiments, three or more GPS units can be utilized. In still another embodiment, a single GPS unit can be used in conjunction with other sensors for purposes of providing redundancy. By way of non-limiting example, by sensing static pressure for pressure-based altitude, the latter can be used in place of GPS altitude from a second, redundant GPS. For purposes of controlling annunciation section 150, an annunciation voting section 1020 can be provided which can include dual warning horns; a green, normal lamp; an amber, caution lamp and a red, failure lamp. Voting section 1020, in a manner that resembles previously described voting section 200 of FIG. 5 with respect to MCP motor control, can vote out annunciation control by any one of the triplex processors/MCPs that disagrees with the other two triplex processors. Each triplex ADP is in dedicated data communication with a respective MCP such that each MCP receives control commands from one ADP for purposes of that MCP generating motor control signals. Each ADP and MCP pair can operate in accordance with the flow diagram of FIG. 7. In this way, the ADP command generated by each ADP influences the motor control signal of its associated MCP such that an MCP that is associated with a failed ADP will be voted out of motor control, as described above. Of course, triplex ADP C does not serve in a motor control capacity, as described above, in being associated with MCP C, but serves to cast votes for comparative purposes. In another embodiment, voting section 200 can operate on votes that are cast by the ADPs which are generated in like manner to the votes that are produced by the MCPs, as described above. Based on the discussions above, it should be appreciated that the embodiment of FIG. 10 can be considered as having a fault tolerance that is fail-functional. That is the auto-pilot remains fully functional, for example, despite a complete failure of any one triplex ADP processor or any one triplex MCP processor. Of course, warnings can be issued to indicate the presence of the failure to the pilot, however, the autopilot can continue operating without the need for pilot intervention.

While the discussions above describe embodiments of an inner control loop in detail which provides an attitude hold or true attitude function that provides for recovery from unusual attitudes on engagement, it should be appreciated that the inner control loop can be configured differently in other embodiments. For example, in another embodiment the inner control loop can be rate based. In such an embodiment, the inner control loop attempts to hold rates to zero. That is, a rate based inner control loop attempts to hold a current attitude of the helicopter at least somewhat constant, whatever the current attitude might be, at the time of engagement of the autopilot. In such an embodiment, it is not necessary for the inner loop to correct for the drift of the rate sensors in the MCPs beyond, for example, washout filters which remove bias errors. Therefore, the current attitude is maintained as at least somewhat constant in being subject to the drift of the rate sensors. The rate gyro drift can result in a change in track and pitch. In particular, the pitch drift can impact the altitude hold and speed hold modes while the roll drift and yaw drift can impact the track. In this regard, however, the outer control loop, as described above, can compensate for and make the gradual necessary changes to correct attitude drift errors in the same manner as if the errors were caused, for example, by long term wind changes. For this reason, there is no requirement in this embodiment for sensors such as a triaxial accelerometer in the inner control loop to provide corrections for drift since only the rate gyro sensing is needed. That is, the MCP sensor suites shown in FIG. 5 do not require triaxial accelerometers. It should be remembered, however, that a rate based inner control loop does not determine the actual or true attitude of the helicopter and, therefore, cannot provide for reliable recovery from an unusual attitude at the time of engagement. The term "true attitude" as used herein is intended to encompass techniques that fully characterize the attitude of the aircraft, at least to an approximation, that can be subject to unavoidable error such as, by way of non-limiting example, measurement inaccuracies.

Still describing details of a rate based inner control loop embodiment, the inner control loop/outer control loop structure described above can be retained. The accelerometers previously described for the inner loop (FIGS. 5 and 10) can be moved to the outer loop and, in an embodiment, can also be reduced to just a single axis for load (G) monitoring. The magnetometers remain as parts of the outer control loop in a rate based system. Because the rate gyro drift is indistinguishable from wind drift, the outer loop control laws can accommodate the drift in the same manner. In an embodiment that does not require an actual heading as an input, there can be no need for magnetometers in the ADPU, particularly when a GPS is incorporated that provides a track output. As discussed above, the inner control loop retains full authority and is rate limited only by the system response. During operation, the inner loop issues control signals that are necessary to hold down the rates for essentially instantaneous changes in attitude. The outer control loop retains more limited authority in that it can command only small rapid actuator motion and slow large actuator motion. Like the attitude hold embodiment, partitioning of functionality between the inner and outer control loops provides for the use of differing reliability and/or DAL software in the two loops.

Attention is now directed to FIG. 11 which is a chart that illustrates six operational modes of the autopilot of the present disclosure versus sensor signals and values that are employed by each mode. The chart of FIG. 11 describes 6 autopilot modes with respect to "Inner Loop" and "Outer Loop" column headings. The inner loop column heading includes sub-columns that are set out in order as "Mode", "Title" which designates the name of each mode, "Rates" which designates the axes about which particular rate gyro signals are measured, "Accels" which designates the axes along which particular accelerometer signals are measured, "Course" which designates a course or path over the ground, "Lat/Lon" which is a GPS position signal including latitude and longitude, "Speed" which designates a GPS-based speed or aircraft sensor-based speed, and "Mag" which designates the particular axes along which magnetometer readings are measured. The outer loop column heading includes the same sub-columns as the inner loop column heading with the addition of "Alt" which is an altitude reading that can be GPS-based or can be determined by a pressure sensitive instrument and "Attitude" which is the true attitude determined by the inner control loop.

Mode 1 is a rate based course and speed hold mode which utilizes a MEMS roll rate signal, a MEMS pitch rate signal and a vertical accelerometer for the inner loop. The vertical axis accelerometer can be used in any mode to ensure that helicopter load limits are not violated. That is, maneuvers which would produce a low-g condition for helicopter having a 2-blade rotor can be avoided as well as maneuvers that could produce a high g condition exceeding structural limits of the helicopter The outer loop for mode 1 uses GPS course, a MEMS yaw rate signal, as well as the pitch rate and vertical accelerometer signals. A speed signal can be taken from the GPS or provided by an aircraft airspeed sensor, as is the case for any mode. In some embodiments, the outer loop for mode 1 can employ GPS information in place of the pitch and/or yaw rate signals.

Mode 2 is a rate based course and altitude hold mode which utilizes a MEMS roll rate signal, a MEMS pitch rate signal and a vertical accelerometer for the inner loop. The outer loop for mode 2 can use the same signals as the outer loop for mode 1 with the addition of an altitude signal. The altitude signal can be GPS-based or obtained from a pressure-based altitude sensor.

Mode 3 is a rate based hover/position hold mode that utilizes a MEMS roll rate signal, a pitch MEMS rate signal and a vertical accelerometer for the inner loop. The outer loop for mode 3 can use the same signals as the outer loop for mode 1 with the addition of a MEMS yaw rate signal and a GPS position signal that provides latitude and longitude. An altitude signal is not required since this mode does not control altitude in the present embodiment. It should be appreciated, however, that an altitude signal can be employed for purposes of indicating the current altitude to the pilot and/or to indicate a change from a desired altitude to the pilot. Horizontal magnetometer signals, which can be oriented along the rotorcraft pitch and roll axes, are also employed.

Mode 4 is a true attitude course and speed hold mode that utilizes a triaxial MEMS rate sensor, a MEMS triaxial accelerometer and a triaxial magnetometer for the inner loop. The latter further utilizes a GPS course signal and can use a GPS speed signal. In another embodiment, the speed signal can be provided by an aircraft airspeed sensor. The outer loop for mode 4 uses GPS course, as well as the pitch and yaw rate signals, the vertical accelerometer signal, the inner loop's estimation of aircraft attitude and the speed signal. In some embodiments, the outer loop for mode 4 can employ GPS information in place of the pitch and/or yaw rate signals, and/or the aircraft attitude estimate.

Mode 5 is a true attitude course and altitude hold mode that utilizes a triaxial MEMS rate sensor, a MEMS triaxial accelerometer and a triaxial magnetometer for the inner loop. The latter further utilizes a GPS course signal and can use a GPS speed signal. In another embodiment, the speed signal can be provided by an aircraft airspeed sensor. The outer loop for mode 5 uses the same signals as the outer loop of mode 4 with the addition of GPS or pressure-based altitude. In some embodiments, the outer loop for mode 5 can employ GPS information in place of the pitch and/or yaw rate signals, and/or the aircraft attitude estimate.

Mode 6 is a true attitude hover/position hold mode that utilizes a triaxial MEMS rate sensor, a MEMS triaxial accelerometer and a triaxial magnetometer for the inner loop. The latter further utilizes a GPS course signal and can use a GPS speed signal. In another embodiment, the speed signal can be provided by an aircraft airspeed sensor. The outer loop for mode 6 uses the same signals as the outer loop of mode 4 with the addition of the yaw rate signal and a GPS position signal that provides latitude and longitude. In some embodiments, the outer loop for mode 6 can employ GPS information in place of the pitch, yaw, and/or roll rate signals and/or the aircraft attitude estimate.

The foregoing description of the invention has been presented for purposes of illustration and description. It is not intended to be exhaustive or to limit the invention to the precise form or forms disclosed. For example, a second instantiation of the autopilot of the present disclosure in a particular installation can provide control of the collective and the tail rotor pedals with the appropriate software. Thus, full autopilot control can be implemented using a "first" autopilot, as described above and a "second" autopilot that manages other flight controls. This modified/dual autopilot system includes four independent actuator drive shafts and can provide an operational mode in which speed and altitude are both held and/or another operational mode in which descent/ascent rate and speed are both held with no pilot control inputs. Generally, in such an embodiment, the inner loop of the second autopilot can manage side slipping using a pedal actuator and hold altitude constant using a collective actuator. Since the inner loop of the first auto-pilot, as described above, can hold pitch constant, airspeed can be held constant via pitch management. Given this configuration, the second autopilot can manage altitude using the collective actuator. For collective control inputs, altitude hold or ascent/descent rate requirements can be based on GPS or pressure data, for example, in outer loop control modes that manage flying approaches or VNAV (Vertical Navigation) where there is a vertical navigation speed requirement. Accordingly, other modifications and variations may be possible in light of the above teachings wherein those of skill in the art will recognize certain modifications, permutations, additions and sub-combinations thereof.

What is claimed is:

1. As part of an autopilot for providing automatic control of a helicopter by actuating one or more flight controls of the helicopter, an actuator arrangement comprising:
at least one electric motor including an output shaft and a motor coil arrangement for receiving a drive current that produces rotation of the output shaft;
an actuator linkage that is operatively coupled between the output shaft of the motor and the flight controls such that rotation of the output shaft produces a corresponding movement of the actuator linkage and the flight controls; and
a motor drive arrangement that is operable to provide said drive current from a power source during normal operation of the autopilot and at least for shorting the motor coil arrangement responsive to a failure of the power source such that the motor provides a braking force on said actuator linkage that serves to stabilize the flight of the helicopter during said power failure.

2. The actuator arrangement of claim 1 wherein the motor drive arrangement is configured to electrically short the motor coil arrangement.

3. The actuator arrangement of claim 2 wherein the motor drive arrangement includes at least one MOSFET that is arranged to at least momentarily electrically connect the motor coil arrangement to a helicopter ground responsive to the power failure.

4. The actuator arrangement of claim 2 including a power storage capacitor that is charged responsive to normal operation of said power source and the motor drive arrangement is configured to discharge the power storage capacitor responsive to the failure of the power source in a way that biases said MOSFET to an on state to at least momentarily short the motor coil arrangement.

5. The actuator arrangement of claim 2 wherein the electric motor includes a Y-connected stator coil having three branch coils and wherein the motor drive arrangement includes a group of MOSFETs that are arranged to cooperatively momentarily short the branch coils responsive to the failure of the power source.

6. The actuator arrangement of claim 5 wherein the group of MOSFETs is arranged to at least momentarily electrically connect each branch coil to a helicopter ground responsive to the power failure.

7. The actuator arrangement of claim 5 including a power storage capacitor that is charged responsive to normal operation of said power source and the actuator arrangement is configured to discharge the power storage capacitor responsive to the failure of the power source in a way that biases each MOSFET of said group to an on state to at least momentarily short the branch coils.

8. The actuator arrangement of claim 2 wherein the motor drive arrangement includes at least one electromechanical relay that is arranged to electrically short the motor coil arrangement responsive to the power failure.

9. The actuator arrangement of claim 8 wherein the electromechanical relay includes at least one normally closed contact that is arranged to electrically connect the motor coil to a helicopter ground responsive to a failure of the power source.

10. An autopilot system for a helicopter which includes a hydraulic assistance system that receives flight control inputs from a pilot and, in turn, produces mechanical outputs that are mechanically coupled to the helicopter to provide pilot control of the helicopter, said autopilot system comprising:
a sensor arrangement that produces a set of sensor outputs that characterize the flight of the helicopter;
a control arrangement that receives the sensor outputs and generates electrical drive signals; and
an actuator arrangement that is electromechanical and receives said electrical drive signals to generate control outputs responsive thereto that are mechanically coupled to the hydraulic assistance system and which is configured to cooperate with the control arrangement to provide automatic flight control of the helicopter in a first, normal mode with the hydraulic assistance system in a normal operational status and in a second, failed mode with the hydraulic assistance system in a failed operational status to provide automatic flight control of the helicopter in each of the normal mode and the failed mode.

11. The autopilot system of claim 10 wherein said sensor arrangement is configured to sense an operational status of the hydraulic assistance system as one of the normal mode and the failed mode and said control arrangement generates the electrical drive signals based on a first, normal set of parameters responsive to detection of the normal mode and a second, failure set of parameters responsive to detection of the failed mode of the hydraulic system.

12. The autopilot system of claim 11 wherein a failure of the hydraulic assistance system creates a dead zone for mechanical control inputs applied thereto and wherein the failure set of parameters is configured at least to compensate for the dead zone.

13. The autopilot system of claim 10 wherein said actuator arrangement couples the control outputs to a cyclic control of the helicopter in parallel with any pilot actuations that are applied to the cyclic control.

14. The autopilot system of claim 10 wherein said helicopter includes a cyclic control that is controlled by said hydraulic assistance system and wherein said actuator arrangement provides mechanical inputs to actuate the hydraulic assistance system.

* * * * *

UNITED STATES PATENT AND TRADEMARK OFFICE
CERTIFICATE OF CORRECTION

PATENT NO. : 9,758,244 B2
APPLICATION NO. : 15/015689
DATED : September 12, 2017
INVENTOR(S) : Mercer et al.

It is certified that error appears in the above-identified patent and that said Letters Patent is hereby corrected as shown below:

On the Title Page

<u>In Inventors:</u>
Change "Nicolas Albion" to --Nicholas Albion--

Signed and Sealed this
Sixteenth Day of April, 2019

Andrei Iancu
*Director of the United States Patent and Trademark Office*